United States Patent
Yi et al.

(10) Patent No.: US 10,805,872 B2
(45) Date of Patent: Oct. 13, 2020

(54) METHOD AND APPARATUS FOR CONFIGURING CONTROL CHANNEL ACCORDING TO BWP OR BEAM SWITCHING IN WIRELESS COMMUNICATION SYSTEM

(71) Applicant: LG Electronics Inc., Seoul (KR)

(72) Inventors: Yunjung Yi, Seoul (KR); Inkwon Seo, Seoul (KR); Jiwon Kang, Seoul (KR); Jonghyun Park, Seoul (KR); Hyunsoo Ko, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/619,382

(22) PCT Filed: Feb. 21, 2019

(86) PCT No.: PCT/KR2019/002141
§ 371 (c)(1),
(2) Date: Dec. 4, 2019

(87) PCT Pub. No.: WO2019/164302
PCT Pub. Date: Aug. 29, 2019

(65) Prior Publication Data
US 2020/0120584 A1   Apr. 16, 2020

Related U.S. Application Data

(60) Provisional application No. 62/672,037, filed on May 15, 2018, provisional application No. 62/662,186, (Continued)

(30) Foreign Application Priority Data

Apr. 27, 2018 (KR) .................. 10-2018-0048935

(51) Int. Cl.
*H04L 5/00* (2006.01)
*H04W 16/28* (2009.01)
(Continued)

(52) U.S. Cl.
CPC .......... *H04W 48/16* (2013.01); *H04L 5/0048* (2013.01); *H04L 5/0053* (2013.01);
(Continued)

(58) Field of Classification Search
CPC ............. H04W 48/16; H04W 74/0866; H04W 74/0833; H04W 72/042; H04W 72/04; H04W 16/28; H04L 5/0053; H04L 5/0048
See application file for complete search history.

(56) References Cited

U.S. PATENT DOCUMENTS

2019/0081751 A1* 3/2019 Miao ..................... H04B 7/0404
2019/0141693 A1* 5/2019 Guo ..................... H04W 72/046

FOREIGN PATENT DOCUMENTS

WO      2018031799       2/2018

OTHER PUBLICATIONS

Samsung, "On Beam Indication", 3GPP TSG RAN WG1 NR AH#3, R1-1715964, Nagoya, Japan, Sep. 18-21, 2017 (Year: 2017).*
(Continued)

*Primary Examiner* — Moo Jeong
(74) *Attorney, Agent, or Firm* — Dentons US LLP

(57) ABSTRACT

According to one embodiment of the present disclosure, a method and an apparatus for allowing a user equipment (UE) to effectively monitor a control resource set (CORESET) in order to read remaining minimum system information (RMSI) in a wireless communication system are provided. The UE receives a media access control (MAC) control element (CE) indication, performs a random access channel (RACH) procedure, determines a transmission configuration indicator (TCI) state of CORESET 0 on the basis
(Continued)

of the most recent of either the MAC CE indication or the RACH procedure, and monitors CORESET 0 on the basis of the determined TCI state.

12 Claims, 12 Drawing Sheets

Related U.S. Application Data filed on Apr. 24, 2018, provisional application No. 62/659,637, filed on Apr. 18, 2018, provisional application No. 62/659,080, filed on Apr. 17, 2018, provisional application No. 62/636,834, filed on Feb. 28, 2018, provisional application No. 62/636,158, filed on Feb. 27, 2018, provisional application No. 62/633,601, filed on Feb. 21, 2018.

(51) Int. Cl.
    *H04W 48/16*     (2009.01)
    *H04W 72/04*     (2009.01)
    *H04W 74/08*     (2009.01)

(52) U.S. Cl.
    CPC ..... *H04W 72/042* (2013.01); *H04W 74/0833* (2013.01); *H04W 74/0866* (2013.01)

(56) References Cited

OTHER PUBLICATIONS

Samsung, On Search Space Design, R1-1717642, 3GPP TSG RAN WG1 Meeting 90bis, Prague, CZ, Oct. 2, 2017, see section 1.

Nokia et al., Remaining details on QCL, R1-1718679, 3GPP TSG RAN WG1 Meeting 90bis, Prague, CZ, Oct. 9, 2017, see sections 2.1-2.2.

Intel Corporation, Remaining details of RMSI design, R1-1800298, 3GPP TSG RAN WG1 Meeting 2018 Ad-hoc #1, Vancouver, Canada, Jan. 13, 2018, see sections 2-3.

Nokia et al, Remaining Details on Beam Recovery, R1-1802557, 3GPP TSG-RAN WG1 Meeting #92, Athens, Greece, Feb. 16, 2018, see sections 2.1-2.3.

NTT DoCoMo, Inc., "Updated work plan for Rel-15 NR WI", 3GPP TSG RAN WG1 Meeting 91, Nov. 27-Dec. 1, 2017, R1-1720787.

Samsung, "Details on configuration of presence of TCI in DCI", 3GPP TSG RAN WG1 Meeting 91, Nov. 27-Dec. 1, 2017, R1-1720308.

Qualcomm Incorporated, "Remaining Details on QCL", 3GPP TSG RAN WG1 Meeting #92, Feb. 26-Mar. 2, 2018, R1-1802832.

Nokia et al., Remaining details on QCL, R1-1718769, 3GPP TSG RAN WG1 Meeting 90bis, Prague, CZ, Oct. 9, 2017, see sections 2.1-2.2.

Samsung, "On Beam Indication", 3GPP TSG RAN WG1 NR AH#3, Sep. 18-21, 2017, R1-1715964.

LG Electronics, "Discussion on group common PDCCH", 3GPP TSG RAN WG1 #90bis, Nov. 27-Dec. 1, 2017, R1-1719919.

Vivo, "Remaining issues on beam measurement and reporting", 3GPP TSG RAN WG1 Meeting #92, Feb. 26-Mar. 2, 2018, R1-1801520.

LG Electronics, "Clarification on PDCCH beam indication by higher-layers", 3GPP TSG RAN WG1 Meeting #92, Feb. 26-Mar. 2, 2018, R1-1802194.

Ericsson, "Feature lead summary 1 of beam measurement and reporting", 3GPP TSG RAN WG1 Meeting AH 1801, Jan. 22-26, 2018, R1-1801006.

\* cited by examiner

METHOD AND APPARATUS FOR CONFIGURING CONTROL CHANNEL ACCORDING TO BWP OR BEAM SWITCHING IN WIRELESS COMMUNICATION SYSTEM

This application is the National Stage filing under 35 U.S.C. 371 of International Application No. PCT/KR2019/002141, filed on Feb. 21, 2019, which claims the benefit of U.S. Provisional Applications No. 62/633,601 filed on Feb. 21 2018, No. 62/636,158 filed on Feb. 27, 2018, No. 62/636,834 filed on Feb. 28, 2018, No. 62/659,080 filed on Apr. 17, 2018, No. 62/659,637 filed on Apr. 18, 2018, No. 62/662,186 filed on Apr. 24, 2018, No. 62/672,037 filed on May 15, 2018 and Korean Patent Application No. 10-2018-0048935, filed on Apr. 27, 2018, the contents of which are all hereby incorporated by reference herein in their entirety.

TECHNICAL FIELD

The present disclosure relates to wireless communication and, more particularly, to a method and apparatus for configuring a control channel according to Bandwidth Part (BWP) and/or beam switching in a wireless communication system, particularly, new radio access technology (NR).

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

The initial access in NR aims initial synchronization to downlink and acquisition of system information; and a Radio Resource Control (RRC) connection through a random access procedure, which is basically the same as the purpose of the initial access techniques of the 3GPP LTE/LTE-A. Furthermore, NR provides various fundamental techniques to be used from the initial access phase for supporting multi-beam transmission and broadband communication.

SUMMARY

The present disclosure discloses configurations of control channels in NR where the network may use a single or multi-beam operations, and a User Equipment (UE) may be configured with different BWPs through RRC or Downlink Control Information (DCI).

In an aspect, a method performed by a User Equipment (UE) in a wireless communication system is provided. The method includes receiving a Media Access Control (MAC) Control Element (CE) indication, performing a Random Access Channel (RACH) procedure, determining a Transmission Configuration Indicator (TCI) state of Control Resource Set (CORESET) 0 based on most recent of the MAC CE indication or the RACH procedure, and monitoring the CORESET 0 based on the determined TCI state.

In another aspect, a User Equipment (UE) in a wireless communication system is provided. The UE includes a memory, a transceiver, and a processor connected to the memory and the transceiver. The processor is configured to control the transceiver to receive a Media Access Control (MAC) Control Element (CE) indication, perform a Random Access Channel (RACH) procedure, determine a Transmission Configuration Indicator (TCI) state of Control Resource Set (CORESET) 0 based on most recent of the MAC CE indication or the RACH procedure, and control the transceiver to monitor the CORESET 0 based on the determined TCI state.

Control channels may be configured effectively.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
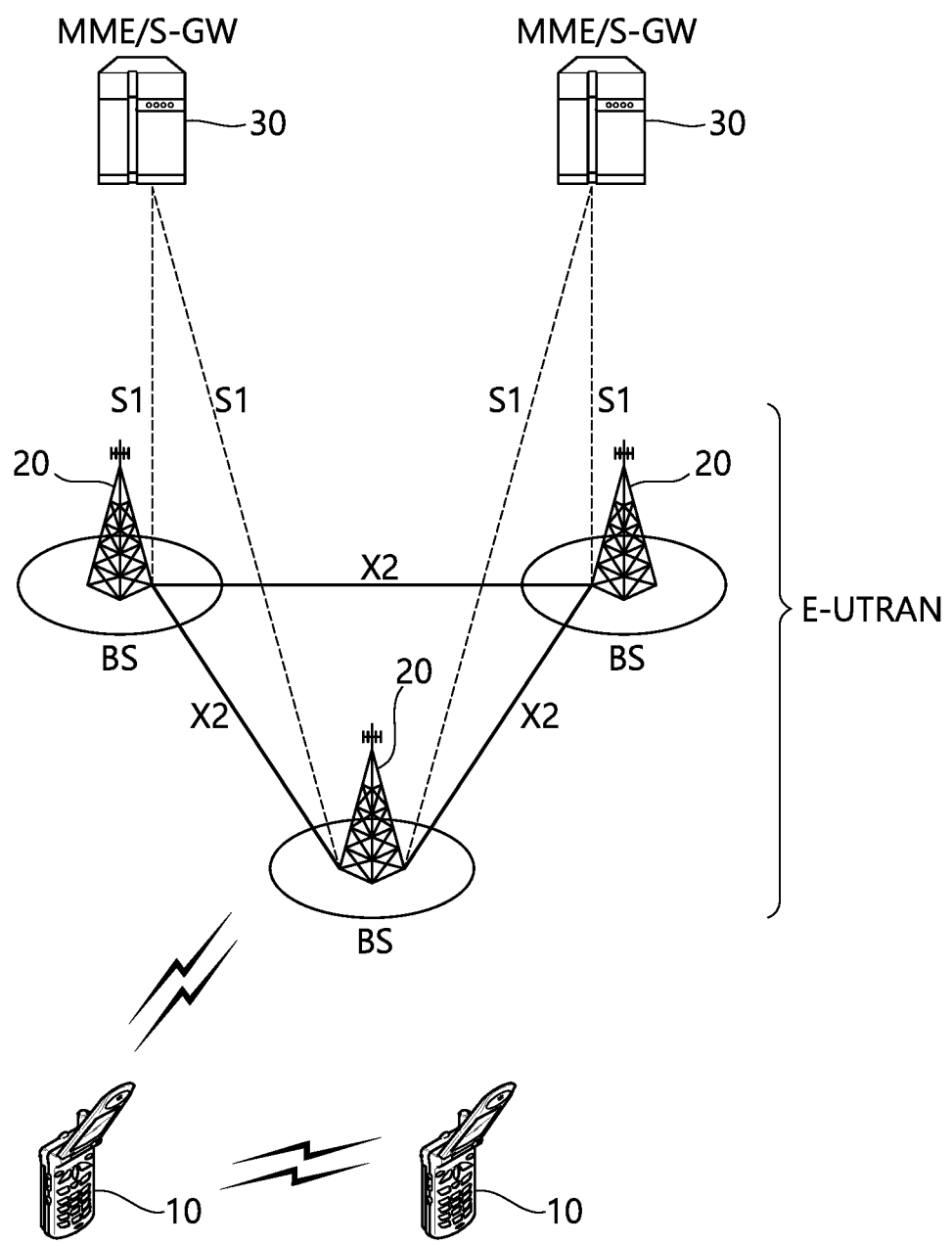
FIG. 1 shows an example of a wireless communication system to which technical features of the present disclosure can be applied.

FIG. 1 shows an example of a wireless communication system to which technical features of the present disclosure can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (RRM), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
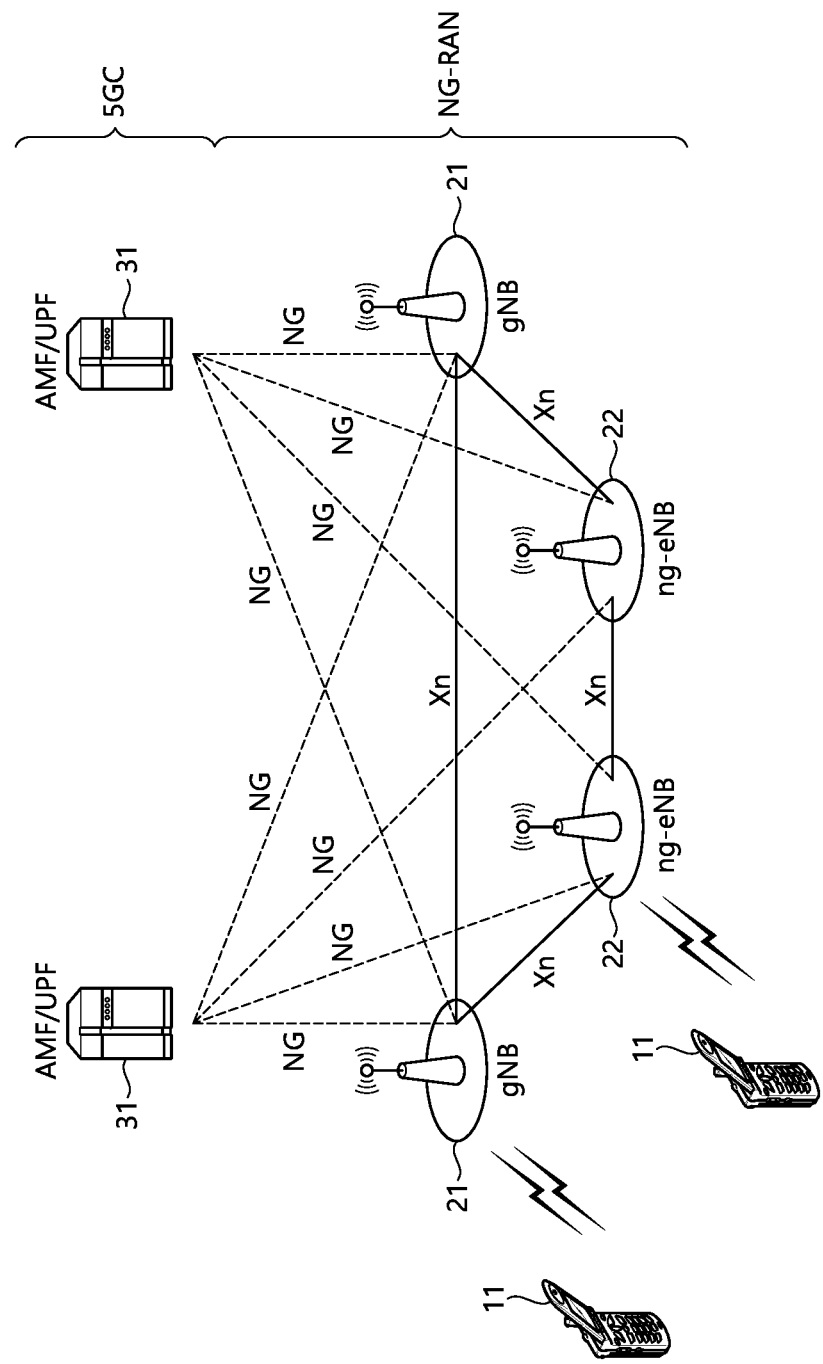
FIG. 2 shows another example of a wireless communication system to which technical features of the present disclosure can be applied.

FIG. 2 shows another example of a wireless communication system to which technical features of the present disclosure can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE.

In the following description, for NR, 3GPP TS 38 series (3GPP TS 38.211, 38.212, 38.213, 38.214, 38.331, etc.) can be referred to in order to facilitate understanding of the following description.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 20 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

Hereinafter, frame structure/physical resources in NR is described.

In LTE/LTE-A, one radio frame consists of 10 subframes, and one subframe consists of 2 slots. A length of one subframe may be 1 ms, and a length of one slot may be 0.5 ms. Time for transmitting one transport block by higher layer to physical layer (generally over one subframe) is defined as a transmission time interval (TTI). A TTI may be the minimum unit of scheduling.

In NR, DL and UL transmissions are performed over a radio frame with a duration of 10 ms. Each radio frame includes 10 subframes. Thus, one subframe corresponds to 1 ms. Each radio frame is divided into two half-frames.

Unlike LTE/LTE-A, NR supports various numerologies, and accordingly, the structure of the radio frame may be varied. NR supports multiple subcarrier spacings in frequency domain. Table 1 shows multiple numerologies supported in NR. Each numerology may be identified by index μ.

TABLE 1

| μ | Subcarrier spacing (kHz) | Cyclic prefix | Supported for data | Supported for synchronization |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Referring to Table 1, a subcarrier spacing may be set to any one of 15, 30, 60, 120, and 240 kHz, which is identified by index μ. However, subcarrier spacings shown in Table 1 are merely exemplary, and specific subcarrier spacings may be changed. Therefore, each subcarrier spacing (e.g. μ=0, 1 . . . 4) may be represented as a first subcarrier spacing, a second subcarrier spacing . . . Nth subcarrier spacing.

Referring to Table 1, transmission of user data (e.g. physical uplink shared channel (PUSCH), physical downlink shared channel (PDSCH)) may not be supported depending on the subcarrier spacing. That is, transmission of user data may not be supported only in at least one specific subcarrier spacing (e.g. 240 kHz).

In addition, referring to Table 1, a synchronization channel (e.g. a primary synchronization signal (PSS), a secondary synchronization signal (SSS), a physical broadcast channel (PBCH)) may not be supported depending on the subcarrier spacing. That is, the synchronization channel may not be supported only in at least one specific subcarrier spacing (e.g. 60 kHz).

One subframe includes $N_{symb}^{subframe,\mu} = N_{symb}^{slot} \times N_{slot}^{subframe,\mu}$ consecutive OFDM symbols. In NR, a number of slots and a number of symbols included in one radio frame/subframe may be different according to various numerologies, i.e. various subcarrier spacings.

Table 2 shows an example of a number of OFDM symbols per slot ($N_{symb}^{slot}$), a number of slots per radio frame ($N_{symb}^{frame,\mu}$), and a number of slots per subframe ($N_{symb}^{subframe,\mu}$) for each numerology in normal cyclic prefix (CP).

TABLE 2

| μ | Number of OFDM symbols per slot ($N_{symb}^{slot}$) | Number of slots per radio frame ($N_{symb}^{frame,\mu}$) | Number of slots per subframe ($N_{symb}^{subframe,\mu}$) |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Referring to Table 2, when a first numerology corresponding to μ=0 is applied, one radio frame includes 10 subframes, one subframe includes to one slot, and one slot consists of 14 symbols.

Table 3 shows an example of a number of OFDM symbols per slot ($N_{symb}^{slot}$), a number of slots per radio frame ($N_{symb}^{frame,\mu}$), and a number of slots per subframe ($N_{symb}^{subframe,\mu}$) for each numerology in extended CP.

TABLE 3

| μ | Number of OFDM symbols per slot ($N_{symb}^{slot}$) | Number of slots per radio frame ($N_{symb}^{frame,\mu}$) | Number of slots per subframe ($N_{symb}^{subframe,\mu}$) |
|---|---|---|---|
| 2 | 12 | 40 | 4 |

Referring to Table 3, μ=2 is only supported in extended CP. One radio frame includes 10 subframes, one subframe includes to 4 slots, and one slot consists of 12 symbols. In the present specification, a symbol refers to a signal transmitted during a specific time interval. For example, a symbol may refer to a signal generated by OFDM processing. That is, a symbol in the present specification may refer to an OFDM/OFDMA symbol, or SC-FDMA symbol, etc. A CP may be located between each symbol.

Figure 3:
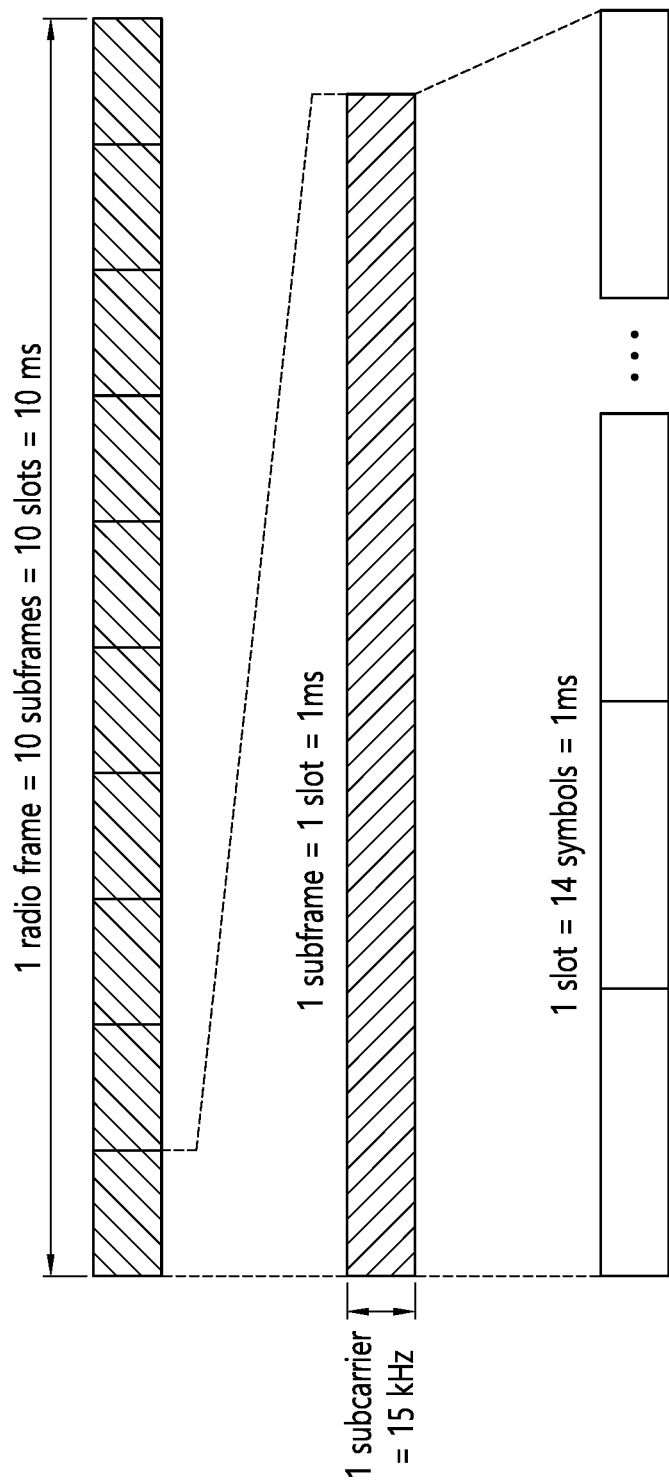
FIG. 3 shows an example of a frame structure to which technical features of the present disclosure can be applied.

FIG. 3 shows an example of a frame structure to which technical features of the present disclosure can be applied. In FIG. 3, a subcarrier spacing is 15 kHz, which corresponds to μ=0.

Figure 4:
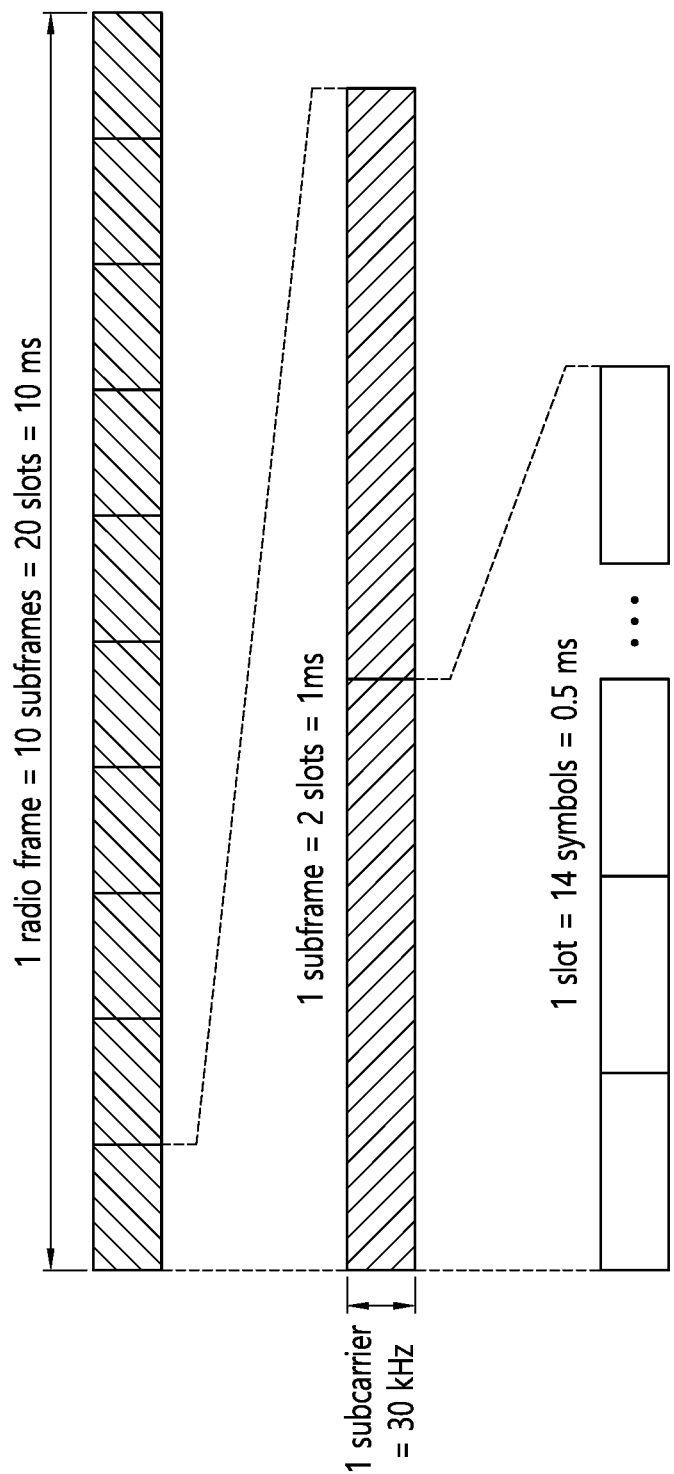
FIG. 4 shows another example of a frame structure to which technical features of the present disclosure can be applied.

FIG. 4 shows another example of a frame structure to which technical features of the present disclosure can be applied. In FIG. 4, a subcarrier spacing is 30 kHz, which corresponds to μ=1.

Meanwhile, a frequency division duplex (FDD) and/or a time division duplex (TDD) may be applied to a wireless communication system to which an embodiment of the present disclosure is applied. When TDD is applied, in LTE/LTE-A, UL subframes and DL subframes are allocated in units of subframes.

In NR, symbols in a slot may be classified as a DL symbol (denoted by D), a flexible symbol (denoted by X), and a UL symbol (denoted by U). In a slot in a DL frame, the UE shall assume that DL transmissions only occur in DL symbols or flexible symbols. In a slot in an UL frame, the UE shall only transmit in UL symbols or flexible symbols. The flexible symbol may be referred to as another terminology, such as reserved symbol, other symbol, unknown symbol, etc.

Table 4 shows an example of a slot format which is identified by a corresponding format index. The contents of the Table 4 may be commonly applied to a specific cell, or may be commonly applied to adjacent cells, or may be applied individually or differently to each UE.

TABLE 4

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |

TABLE 4-continued

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 2 | X | X | X | X | X | X | X | X | X | X | X | X | X | X |
| 3 | D | D | D | D | D | D | D | D | D | D | D | D | D | X |
| ... | | | | | | | | | | | | | | |

For convenience of explanation, Table 4 shows only a part of the slot format actually defined in NR. The specific allocation scheme may be changed or added.

The UE may receive a slot format configuration via a higher layer signaling (i.e. radio resource control (RRC) signaling). Or, the UE may receive a slot format configuration via downlink control information (DCI) which is received on PDCCH. Or, the UE may receive a slot format configuration via combination of higher layer signaling and DCI.

Figure 5:
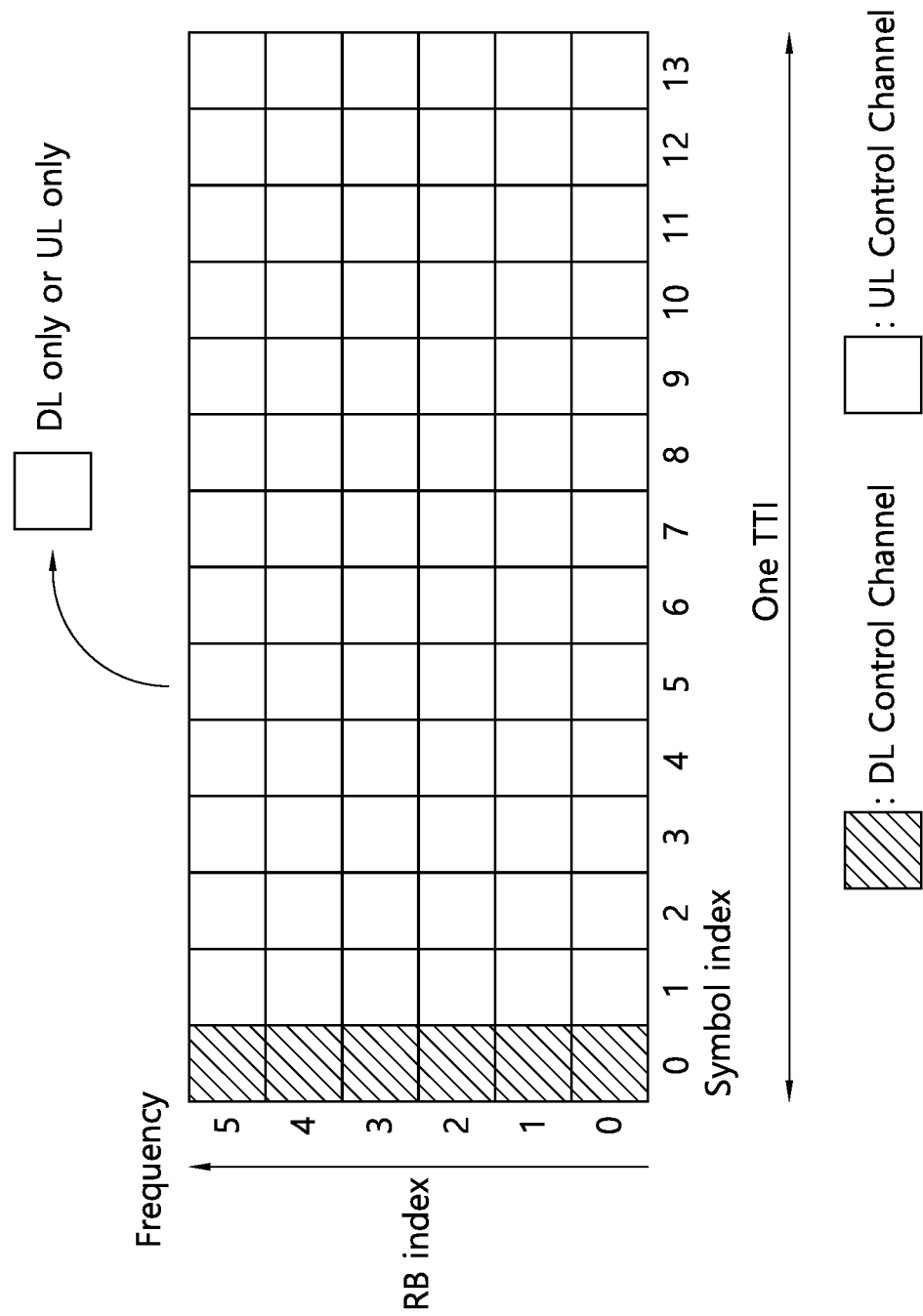
FIG. 5 shows an example of a subframe structure used to minimize latency of data transmission when TDD is used in NR.

FIG. 5 shows an example of a subframe structure used to minimize latency of data transmission when TDD is used in NR. The subframe structure shown in FIG. 5 may be called a self-contained subframe structure.

Referring to FIG. 5, the subframe includes DL control channel in the first symbol, and UL control channel in the last symbol. The remaining symbols may be used for DL data transmission and/or for UL data transmission. According to this subframe structure, DL transmission and UL transmission may sequentially proceed in one subframe. Accordingly, the UE may both receive DL data and transmit UL acknowledgement/non-acknowledgement (ACK/NACK) in the subframe. As a result, it may take less time to retransmit data when a data transmission error occurs, thereby minimizing the latency of final data transmission.

In the self-contained subframe structure, a time gap may be required for the transition process from the transmission mode to the reception mode or from the reception mode to the transmission mode. For this purpose, some symbols at the time of switching from DL to UL in the subframe structure may be set to the guard period (GP).

Figure 6:
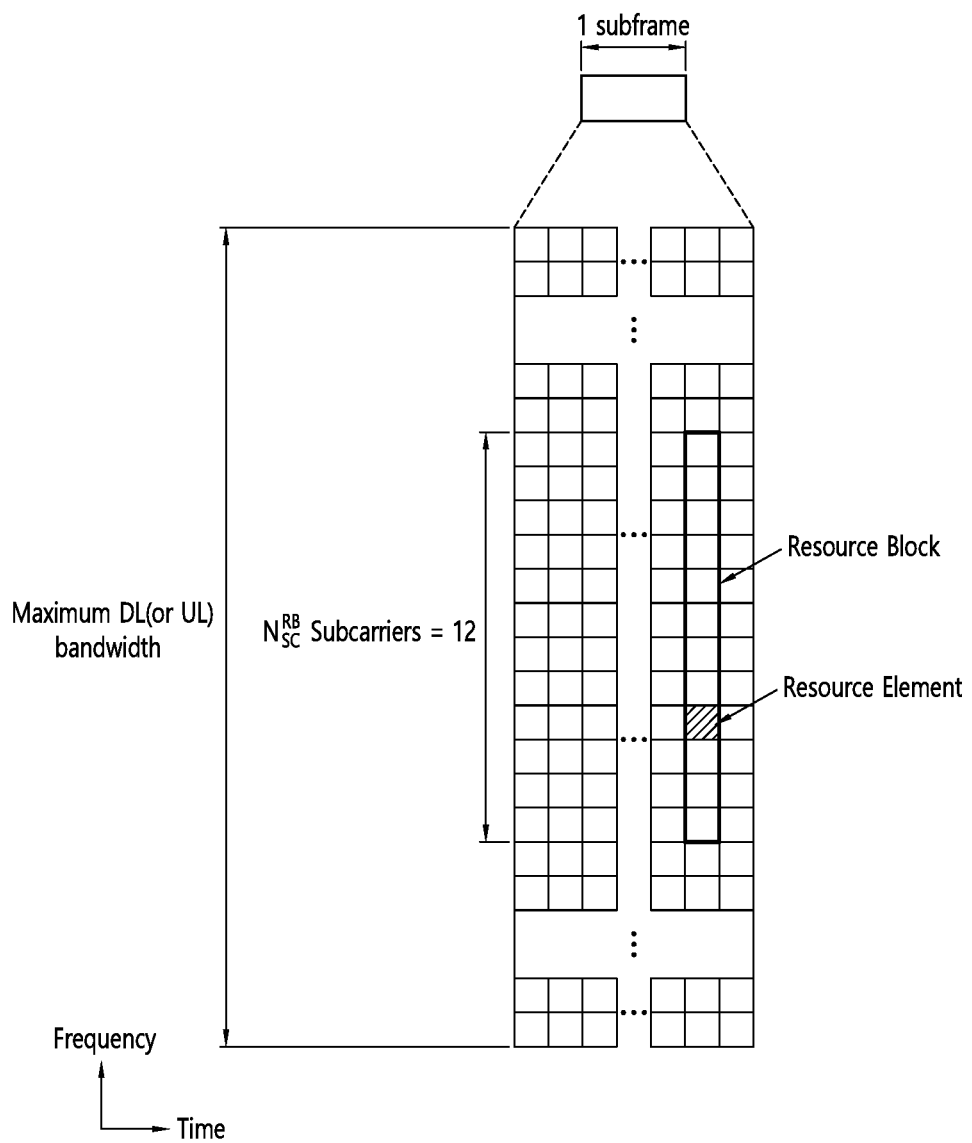
FIG. 6 shows an example of a resource grid to which technical features of the present disclosure can be applied.

FIG. 6 shows an example of a resource grid to which technical features of the present disclosure can be applied. An example shown in FIG. 6 is a time-frequency resource grid used in NR. An example shown in FIG. 6 may be applied to UL and/or DL.

Referring to FIG. 6, multiple slots are included within one subframe on the time domain. Specifically, when expressed according to the value of "μ", "14.2μ" symbols may be expressed in the resource grid. Also, one resource block (RB) may occupy 12 consecutive subcarriers. One RB may be referred to as a physical resource block (PRB), and 12 resource elements (REs) may be included in each PRB. The number of allocatable RBs may be determined based on a minimum value and a maximum value. The number of allocatable RBs may be configured individually according to the numerology ("μ"). The number of allocatable RBs may be configured to the same value for UL and DL, or may be configured to different values for UL and DL.

Hereinafter, a cell search in NR is described.

The UE may perform cell search in order to acquire time and/or frequency synchronization with a cell and to acquire a cell identifier (ID). Synchronization channels such as PSS, SSS, and PBCH may be used for cell search.

Figure 7:
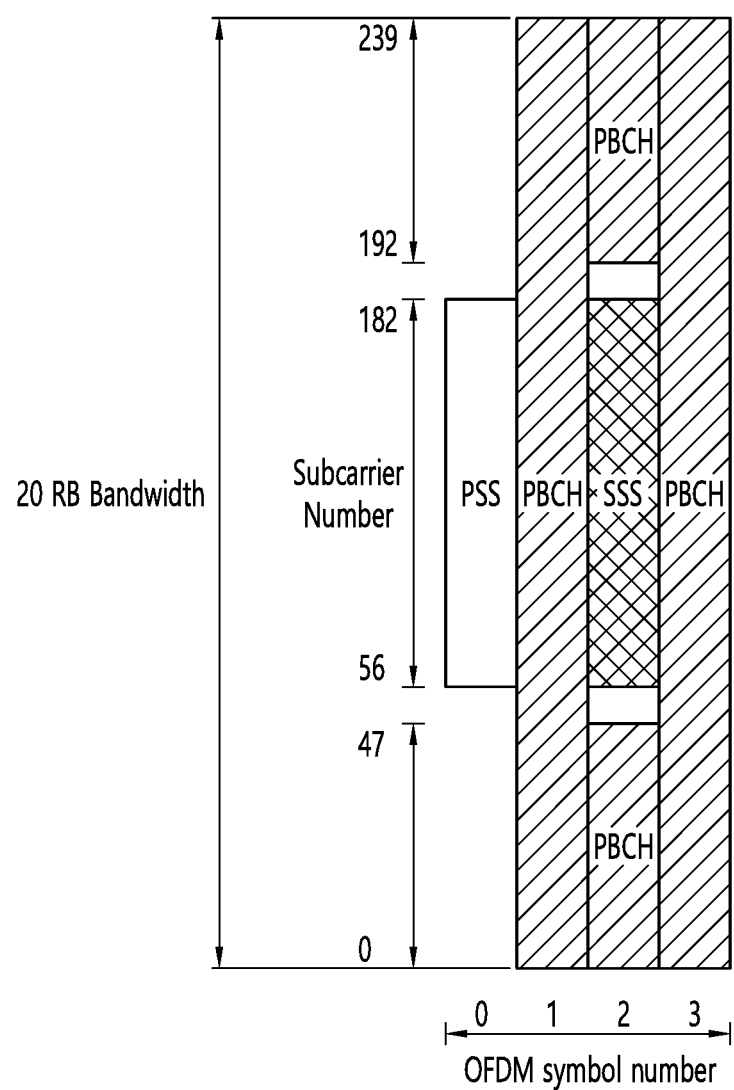
FIG. 7 shows an example of a synchronization channel to which technical features of the present disclosure can be applied.

FIG. 7 shows an example of a synchronization channel to which technical features of the present disclosure can be applied. Referring to FIG. 7, the PSS and SSS may include one symbol and 127 subcarriers. The PBCH may include 3 symbols and 240 subcarriers.

The PSS is used for synchronization signal (SS)/PBCH block symbol timing acquisition. The PSS indicates 3 hypotheses for cell ID identification. The SSS is used for cell ID identification. The SSS indicates 336 hypotheses. Consequently, 1008 physical layer cell IDs may be configured by the PSS and the SSS.

The SS/PBCH block may be repeatedly transmitted according to a predetermined pattern within the 5 ms window. For example, when L SS/PBCH blocks are transmitted, all of SS/PBCH block #1 through SS/PBCH block # L may contain the same information, but may be transmitted through beams in different directions. That is, quasi co-located (QCL) relationship may not be applied to the SS/PBCH blocks within the 5 ms window. The beams used to receive the SS/PBCH block may be used in subsequent operations between the UE and the network (e.g. random access operations). The SS/PBCH block may be repeated by a specific period. The repetition period may be configured individually according to the numerology.

Referring to FIG. 7, the PBCH has a bandwidth of 20 RBs for the 2nd/4th symbols and 8 RBs for the 3rd symbol. The PBCH includes a demodulation reference signal (DM-RS) for decoding the PBCH. The frequency domain for the DM-RS is determined according to the cell ID. Unlike LTE/LTE-A, since a cell-specific reference signal (CRS) is not defined in NR, a special DM-RS is defined for decoding the PBCH (i.e. PBCH-DMRS). The PBCH-DMRS may contain information indicating an SS/PBCH block index.

The PBCH performs various functions. For example, the PBCH may perform a function of broadcasting a master information block (MIB). System information (SI) is divided into a minimum SI and other SI. The minimum SI may be divided into MIB and system information block type-1 (SIB1). The minimum SI excluding the MIB may be referred to as a remaining minimum SI (RMSI). That is, the RMSI may refer to the SIB1.

The MIB includes information necessary for decoding SIB1. For example, the MIB may include information on a subcarrier spacing applied to SIB1 (and MSG 2/4 used in the random access procedure, other SI), information on a frequency offset between the SS/PBCH block and the subsequently transmitted RB, information on a bandwidth of the PDCCH/SIB, and information for decoding the PDCCH (e.g. information on search-space/control resource set (CORESET)/DM-RS, etc., which will be described later). The MIB may be periodically transmitted, and the same information may be repeatedly transmitted during 80 ms time interval. The SIB1 may be repeatedly transmitted through the PDSCH. The SIB1 includes control information for initial access of the UE and information for decoding another SIB.

Hereinafter, DL control channel in NR is described.

The search space for the PDCCH corresponds to aggregation of control channel candidates on which the UE performs blind decoding. In LTE/LTE-A, the search space for the PDCCH is divided into a common search space (CSS) and a UE-specific search space (USS). The size of each search space and/or the size of a control channel element (CCE) included in the PDCCH are determined according to the PDCCH format.

In NR, a resource-element group (REG) and a CCE for the PDCCH are defined. In NR, the concept of CORESET is defined. Specifically, one REG corresponds to 12 REs, i.e. one RB transmitted through one OFDM symbol. Each REG includes a DM-RS. One CCE includes a plurality of REGs (e.g. 6 REGs). The PDCCH may be transmitted through a resource consisting of 1, 2, 4, 8, or 16 CCEs. The number of CCEs may be determined according to the aggregation level. That is, one CCE when the aggregation level is 1, 2 CCEs when the aggregation level is 2, 4 CCEs when the aggregation level is 4, 8 CCEs when the aggregation level is 8, 16 CCEs when the aggregation level is 16, may be included in the PDCCH for a specific UE.

The CORESET is a set of resources for control signal transmission. The CORESET may be defined on 1/2/3 OFDM symbols and multiple RBs. In LTE/LTE-A, the number of symbols used for the PDCCH is defined by a physical control format indicator channel (PCFICH). However, the PCFICH is not used in NR. Instead, the number of symbols used for the CORESET may be defined by the RRC message (and/or PBCH/SIB1). Also, in LTE/LTE-A, since the frequency bandwidth of the PDCCH is the same as the entire system bandwidth, so there is no signaling regarding the frequency bandwidth of the PDCCH. In NR, the frequency domain of the CORESET may be defined by the RRC message (and/or PBCH/SIB1) in a unit of RB.

The base station may transmit information on the CORESET to the UE. For example, information on the CORESET configuration may be transmitted for each CORESET. Via the information on the CORESET configuration, at least one of a time duration of the corresponding CORESET (e.g. 1/2/3 symbol), frequency domain resources (e.g. RB set), REG-to-CCE mapping type (e.g. whether interleaving is applied or not), precoding granularity, a REG bundling size (when the REG-to-CCE mapping type is interleaving), an interleaver size (when the REG-to-CCE mapping type is interleaving) and a DMRS configuration (e.g. scrambling ID) may be transmitted. When interleaving to distribute the CCE to 1-symbol CORESET is applied, bundling of two or six REGs may be performed. Bundling of two or six REGs may be performed on the two symbols CORESET, and time first mapping may be applied. Bundling of three or six REGs may be performed on the three symbols CORESET, and a time first mapping may be applied. When REG bundling is performed, the UE may assume the same precoding for the corresponding bundling unit.

In NR, the search space for the PDCCH is divided into CSS and USS. The search space may be configured in CORESET. As an example, one search space may be defined in one CORESET. In this case, CORESET for CSS and CORESET for USS may be configured, respectively. As another example, a plurality of search spaces may be defined in one CORESET. That is, CSS and USS may be configured in the same CORESET. In the following example, CSS means CORESET in which CSS is configured, and USS means CORESET in which USS is configured. Since the USS may be indicated by the RRC message, an RRC connection may be required for the UE to decode the USS. The USS may include control information for PDSCH decoding assigned to the UE.

Since the PDCCH needs to be decoded even when the RRC configuration is not completed, CSS should also be defined. For example, CSS may be defined when a PDCCH for decoding a PDSCH that conveys SIB1 is configured or when a PDCCH for receiving MSG 2/4 is configured in a random access procedure. Like LTE/LTE-A, in NR, the PDCCH may be scrambled by a radio network temporary identifier (RNTI) for a specific purpose.

A resource allocation in NR is described.

In NR, a specific number (e.g. up to 4) of bandwidth parts (BWPs) may be defined. A BWP (or carrier BWP) is a set of consecutive PRBs, and may be represented by consecutive subsets of common RBs (CRBs). Each RB in the CRB may be represented by CRB1, CRB2, etc., beginning with CRB0.

Figure 8:
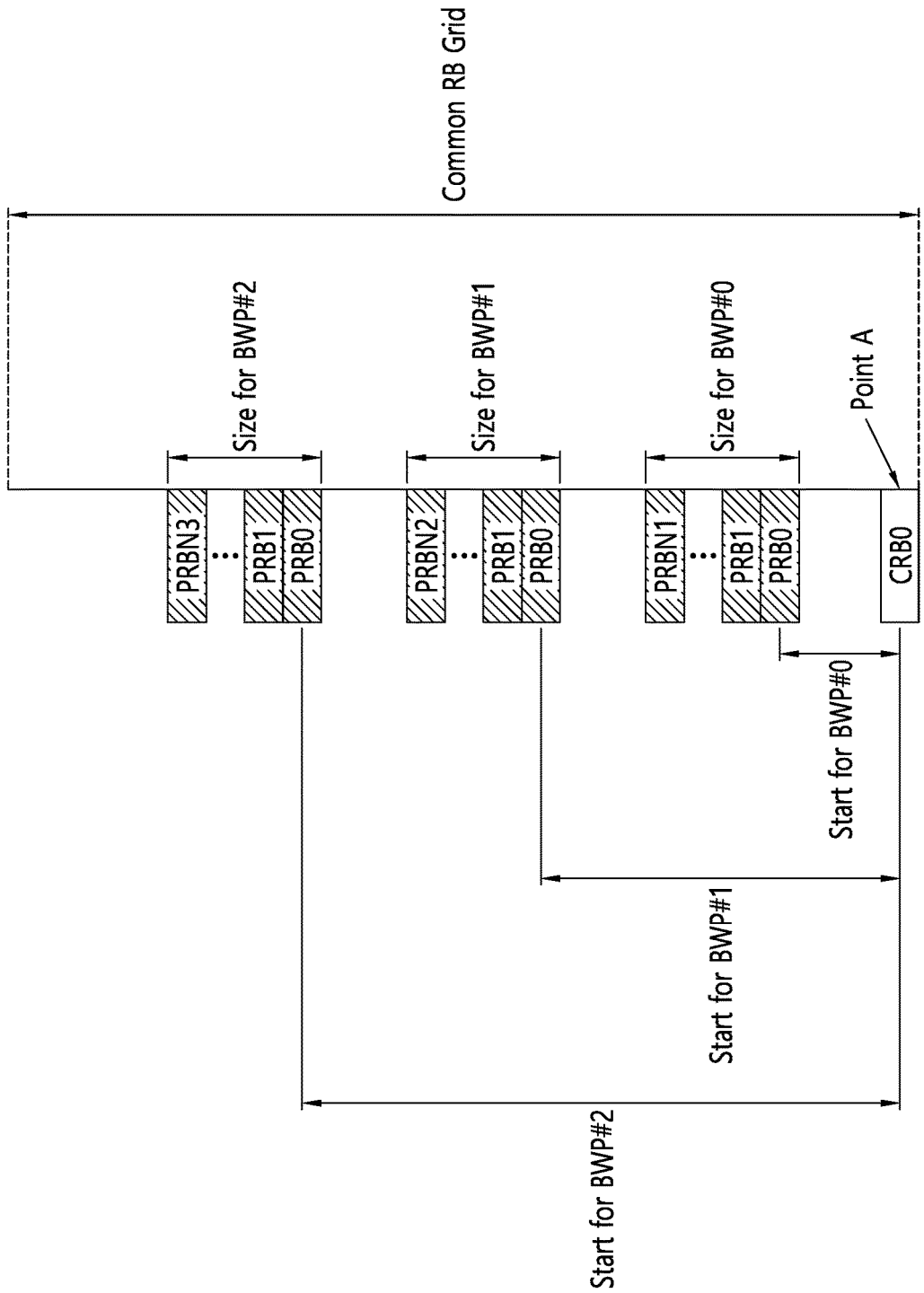
FIG. 8 shows an example of a frequency allocation scheme to which technical features of the present disclosure can be applied.

FIG. 8 shows an example of a frequency allocation scheme to which technical features of the present disclosure can be applied.

Referring to FIG. 8, multiple BWPs may be defined in the CRB grid. A reference point of the CRB grid (which may be referred to as a common reference point, a starting point, etc.) is referred to as so-called "point A" in NR. The point A is indicated by the RMSI (i.e. SIB1). Specifically, the frequency offset between the frequency band in which the SS/PBCH block is transmitted and the point A may be indicated through the RMSI. The point A corresponds to the center frequency of the CRB0. Further, the point A may be a point at which the variable "k" indicating the frequency band of the RE is set to zero in NR. The multiple BWPs shown in FIG. 8 is configured to one cell (e.g. primary cell (PCell)). A plurality of BWPs may be configured for each cell individually or commonly.

Referring to FIG. 8, each BWP may be defined by a size and starting point from CRB0. For example, the first BWP, i.e. BWP #0, may be defined by a starting point through an offset from CRB0, and a size of the BWP #0 may be determined through the size for BWP #0.

A specific number (e.g. up to four) of BWPs may be configured for the UE. Even if a plurality of BWPs are configured, only a specific number (e.g. one) of BWPs may be activated per cell for a given time period. However, when the UE is configured with a supplementary uplink (SUL) carrier, maximum of four BWPs may be additionally configured on the SUL carrier and one BWP may be activated for a given time. The number of configurable BWPs and/or the number of activated BWPs may be configured commonly or individually for UL and DL. Also, the numerology and/or CP for the DL BWP and/or the numerology and/or CP for the UL BWP may be configured to the UE via DL signaling. The UE can receive PDSCH, PDCCH, channel state information (CSI) RS and/or tracking RS (TRS) only on the active DL BWP. Also, the UE can transmit PUSCH and/or physical uplink control channel (PUCCH) only on the active UL BWP.

Figure 9:
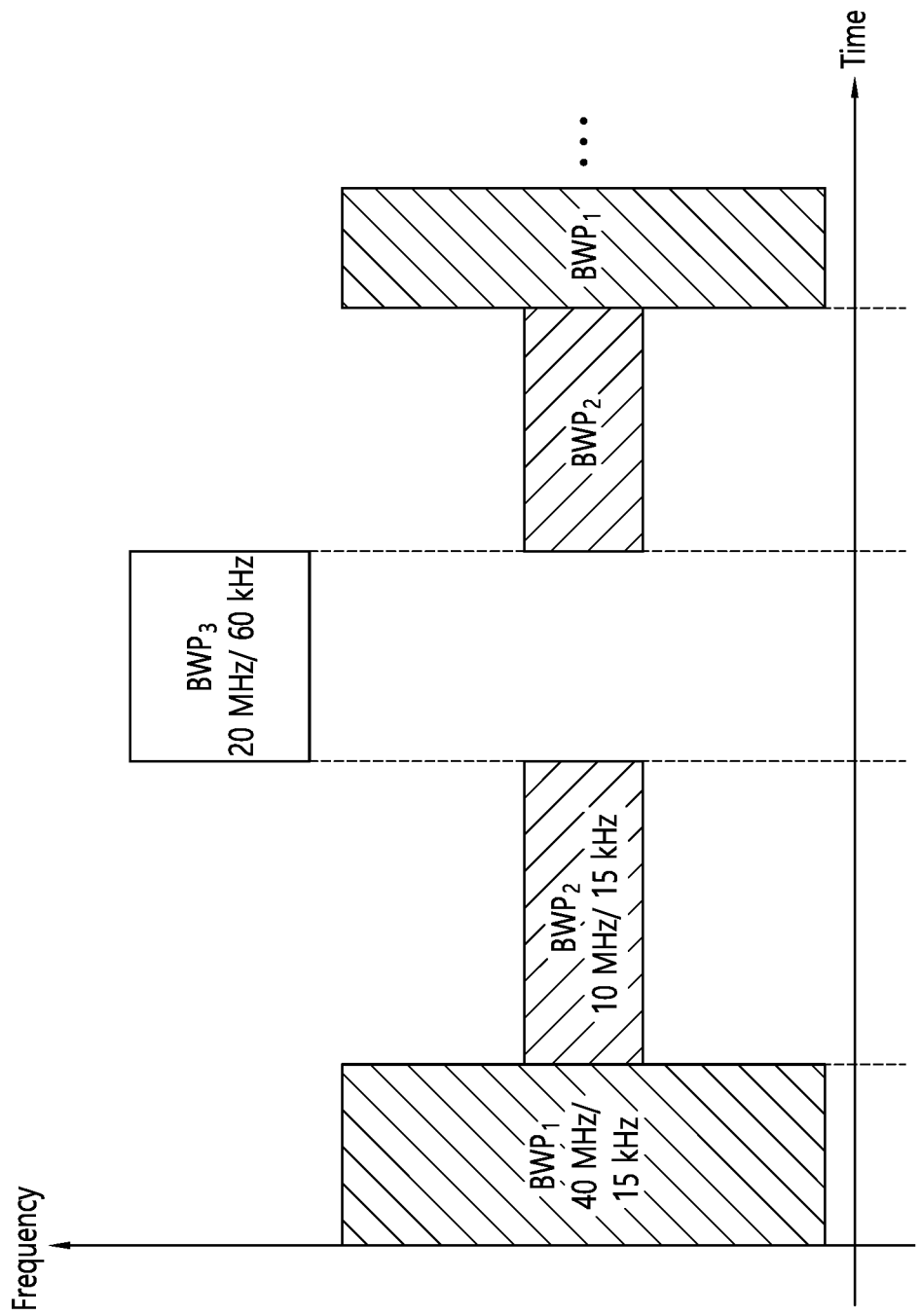
FIG. 9 shows an example of multiple BWPs to which technical features of the present disclosure can be applied.

FIG. 9 shows an example of multiple BWPs to which technical features of the present disclosure can be applied.

Referring to FIG. 9, 3 BWPs may be configured. The first BWP may span 40 MHz band, and a subcarrier spacing of 15 kHz may be applied. The second BWP may span 10 MHz band, and a subcarrier spacing of 15 kHz may be applied. The third BWP may span 20 MHz band and a subcarrier spacing of 60 kHz may be applied. The UE may configure at least one BWP among the 3 BWPs as an active BWP, and may perform UL and/or DL data communication via the active BWP.

A time resource may be indicated in a manner that indicates a time difference/offset based on a transmission time point of a PDCCH allocating DL or UL resources. For example, the start point of the PDSCH/PUSCH corresponding to the PDCCH and the number of symbols occupied by the PDSCH/PUSCH may be indicated.

Carrier aggregation (CA) is described. Like LTE/LTE-A, CA can be supported in NR. That is, it is possible to aggregate continuous or discontinuous component carriers (CCs) to increase the bandwidth and consequently increase the bit rate. Each CC may correspond to a (serving) cell, and each CC/cell may be divided into a primary serving cell (PSC)/primary CC (PCC) or a secondary serving cell (SSC)/secondary CC (SCC).

In NR, single beam and multi-beam operations are expected. The network may deploy single or multi-beams. Different single beams may be used at different times. Regardless of whether single or multi-beam is deployed, it may be necessary to indicate which resources to monitor for control channel monitoring from a UE perspective. Particularly, in case multi-beam is used or repetition is used, the same control channel may be transmitted over multiple occasions from a UE perspective.

The present disclosure discloses how to assign and detect beam direction and/or CORESET configuration from a UE perspective for control channel monitoring/reception. Also, the present disclosure may be applied for control transmission for uplink. Also, the present disclosure may be applied for sidelink control transmission. Particularly, given that an implicit or explicit Quasi Colocation (QCL) assumption is used for each CORESET, the present disclosure discusses reception beam configuration for each search space set and QCL assumption of a UE.

In what follows, various aspects of the present disclosure that may be proposed according to the respective embodiments of the present disclosure will be described.

1. QCL Information (or Transmission Configuration Indicator (TCI) Status)

In NR, QCL may be associated with an initially accessed SS/PBCH block and/or CSI-RS that may be configured for each CORESET. This association may be implicit or explicit. The following specifics may be considered for each CORESET.

(1) CORESET 0 (RMSI CORESET)

The QCL and reception beam may be determined implicitly based on the initially accessed SS/PBCH block and/or SS/PBCH block associated with the transmitted Physical Random Access Channel (PRACH). Also, the QCL and reception beam may be determined explicitly through an MAC CE. If the QCL and reception beam is determined implicitly and the beam is changed between PRACH and MSG3, the UE may indicate change of the beam through the MSG3. According to the Random Access Channel (RACH) procedure, the corresponding downlink beam and/or SS/PBCH block index may be updated automatically. For most cases, the QCL information of CORESET 0 may be determined implicitly through the RACH procedure. There may be no explicit TCI indication about the CORESET 0 by which QCL information of the CORESET 0 is updated. The associated search space for RMSI/Other System Information (OSI)/paging/Random Access Response (RAR) along with SS/PBCH block may be updated automatically according to the SS/PBCH block index of the best SS/PBCH block in configuring a search space associated with the CORESET 0 after the RACH procedure. In other words, a monitoring occasion of a search space associated with the CORESET 0 may be updated automatically if the associated SS/PBCH block index is changed due to beam recovery or other reason. This update may be indicated explicitly by the network to be coordinated. The RACH procedure that implicitly determines the QCL information of the CORESET 0 may correspond to any one of the following.

- Only through RACH procedure except for beam recovery procedure
- Through RACH procedure including beam recovery procedure: if the best beam is switched according to the beam recovery procedure, the UE may update QCL information of the CORESET 0 after transmitting a beam recovery request through the RACH procedure.
- Through beam recovery procedure and RACH procedure including beam recovery procedure: if the RACH procedure or beam recovery procedure changes the best beam, the UE may automatically update QCL/reception beam information of the CORESET 0.
- Through RACH procedure excluding beam recovery procedure: In this case, if beam recovery CORESET is configured as CORESET 0, the beam recovery procedure may be used.
- Only through the contention-based RACH procedure regardless of beam recovery procedure and/or other RACH procedure: If it is assumed that the contention-based RACH procedure changes an associated SS/PBCH block and/or the best SS/PBCH block, the QCL assumption on the currently best SS/PBCH block may no longer be correct. Therefore, the TCI state of the CORESET may be updated and/or reconfigured by the contention-based RACH procedure. In other words, if the RACH procedure is changed and/or the RACH procedure does not occur on the QCLed SS/PBCH block index, CORESETs associated with the corresponding outdated SS/PBCH block index may be reconfigured. The TCI state of CORESET may be implicitly or explicitly configured (the TCI state may be configured differently depending on the CORESET). For example, if the TCI state of the CORESET is configured implicitly, the new best beam based on the RACH procedure may be automatically updated as the TCI state of CORESET until the TCI state is reconfigured. If the TCI state of the CORESET is configured explicitly, the TCI state may not be defined until it is reconfigured. The UE does not have to monitor a CORESET/associated search space set without TCI state. In the case of contention-free RACH procedure, since the index of QCLed SS/PBCH block may neither be changed nor exist, it may be assumed that the TCI state of CORESET is not updated and/or reconfigured by the contention-free RACH procedure.

More specifically, QCL information and/or TCI state of each search space may be defined as follows.

- System Information RNTI (SI-RNTI): How to select a search space occasion for SI-RNTI based on association between SI-RNTI search space/CORESET and SS/PBCH block depends on the UE implementation. If the UE also needs to monitor the USS on the same search space for SI-RNTI, the UE may monitor a search space associated with the SS/PBCH block received in association with MSG4 (or RAR according to whether contention has occurred). The UE may monitor the search space associated with that SS/PBCH block, and if the best beam has been changed, the UE may additionally monitor a different search space associated with another SS/PBCH block.
- Random Access RNTI (RA-RNTI): A search space or TCI state or QCL information for RA-RNTI is determined according to the following two cases. First, if a contention-based RACH procedure occurs or if the RACH procedure is triggered through an UE autonomous procedure and an RAR is transmitted through common search space or search space associated with beam recovery failure, the CORESET/TCI state of the associated search space may be determined based on the RACH procedure. Similarly, if the RACH procedure is triggered by a PDCCH command, it may be assumed that RAR is transmitted by using the QCL information the same as the QCL information used for transmission of the PDCCH command.

MSG4: It may be processed in the same way as the RA-RNTI.

Unicast search space: The QCL information about C-RNTI on the USS or CSS may be implicitly the same as the QCL information assumed for the MSG4 (or RAR) in the recent RACH procedure. Unless the RACH procedure occurs or a beam associated with the SS/PBCH block is made available through the beam recovery procedure, it may be assumed that change of the best SS/PBCH block index does not lead to change of the QCL state. The QCL information of C-RNTI on the USS/CSS may determine a search space occasion in which the UE is expected to monitor C-RNTI and/or other RNTI. As pointed out above, if the UE changes the best SS/PBCH block index, the UE may monitor another RNTI in a different search space occasion. However, unicast may not be monitored, and the UE may not be required to monitor unicast in the search space occasion not associated with the SS/PBCH block index.

Whenever there is RACH procedure, the TCI state/QCL information of CORESET 0 may be updated (CORESET 0 may be used for reception of RAR or MSG4).

The same attribute may be maintained for CORESET 0 (or CORESET # x in the case of SI-RNTI/Paging RNTI (P-RNTI)/RA-RNTI) rather than the initial DL BWP.

The TCI state/QCL information for transmission of a PUCCH corresponding to the MSG4 may follow the TCI state/QCL information of the MSG4.

A beam recovery CORESET may have QCL/TCI characteristics similar to those of the CORESET 0. In other words, the TCI state of the beam recovery CORESET may be determined based on the beam recovery procedure.

In general, other options in the TCI state with respect to the CORESET 0 may be considered as follows.

Different TCI states (QCL is determined based on the RACH procedure) not including the TCI state may be configured for the respective search state sets associated with the CORESET 0.

The TCI state may be configured for the CORESET 0 and may be only applied to a CORESET or search space set that may be broadcast in a non-cell specific manner. In other words, while the QCL information is determined based on the RACH procedure with respect to RMSI/OSI/RAR/MSG4/MSG3 retransmission/paging, other search space (for example, Slot Format Indicator (SFI), Paging Indicator (PI), USS) may comply with the configured TCI state. Unless explicitly configured otherwise, the existing TCI state may be maintained if the TCI is configured explicitly.

The TCI state may also be configured for the CORESET 0. The TCI state may be updated by RRC or RACH procedure. In other words, the TCI state may be configured, and the configured TCI may be maintained until the RACH procedure changes beams. If RACH procedure (for example, contention-based RACH procedure or one of the contention-based or contention-free RACH procedure) occurs, the TCI state may also be updated. The TCI state may also be updated by RRC.

The TCI state may not be configured for the CORESET 0 (or particular CORESET). Even when an explicit TCI state is not configured, the TCI state may be indicated or activated based on the MAC CE. At this time, 1) it may be assumed that all the possible SS/PBCH block indexes are available in the frequency range. For example, if 64 SS/PBCH block entries are available in the frequency range, an 8-bit bitmap may be used to express the SS/PBCH block index for the TCI state. In this case, the QCL type may be assumed to be a specific QCL type (for example, D type). Or, 2) it may be assumed that the SS/PBCH block index is indicated as an SS/PBCH block transmitted through SSBtransmitted via SIB1 signaling or UE-specific signaling. This may cause some ambiguity in the case of SS/PBCH block update. Or, 3) it may be assumed that a set of TCI states has a QCL relationship for each configured beam monitoring/failure management RS (for which a specific QCL type such as the QCL type D is assumed). In other words, a TCI state configured based on the beam recovery procedure may be considered. Or, 4) it may be assumed that a set of TCI states has a QCL relationship for each configured Radio Link Monitoring (RLM)-RS (for which a specific QCL type such as the QCL type D is assumed). In other words, a TCI state configured based on the RLM procedure may be considered.

Different options may be considered according to a CORESET or CORESET index or BWP to which a CORESET is connected or cell configured with a CORESET. For example, in the case of PCell CORESET, option 4 (in other words, a set of TCI states has a QCL relationship for each configured RLM-RS) may be considered, and in the case of CORESET 0/1, option 1 (in other words, all the possible SS/PBCH block indexes are available in the frequency range) may be considered. Also, if option 3 (in other words, a set of TCI states has a QCL relationship for each configured beam monitoring/failure management RS) or option 4 is considered, the option may fall back to the option 1 if an explicit RS configuration is not given. In other words, as long as an explicit RS configuration exists, the option 3 or 4 may be used. In the absence of an explicit RS configuration, the option 1 may be used.

When indicated by the MAC CE for a specific SS/PBCH block index, the UE may assume that TCI state of the CORESET is adjusted based on the MAC CE. If RACH procedure that changes an associated SS/PBCH block is performed after the MAC CE indication (for example, if a beam failure through a CSI-RS associated with the SS/PBCH block or beam failure through the SS/PBCH block or contention-based RACH procedure or UE receives an RAR), the TCI state may be automatically updated accordingly. In particular, in the case of CORESET 0 and/or CORESET 1, updating the TCI state based on the RACH procedure may be needed to receive the RAR/MSG4. In this regard, at least for the CORESET 0 and/or CORESET 1, the most recent of the RACH procedure or MAC CE indication or RRC configuration may update the TCI state or QCL assumption. This mechanism may also be applied to other CORESETs without an explicit TCI RRC configuration, other CORESETs that may not be explicitly mapped to the TCI state, or other CORESETs requiring different processing.

The RACH procedure that updates the TCI state described in the present disclosure may mean one or part or all of the following.

Beam failure based on a CSI-RS related to an SS/PBCH block.

Beam failure based on the SS/PBCH block.

Contention-based RACH procedure.

RACH procedure in which a UE expects reception of an RAR irrespective of contention.

Figure 10:
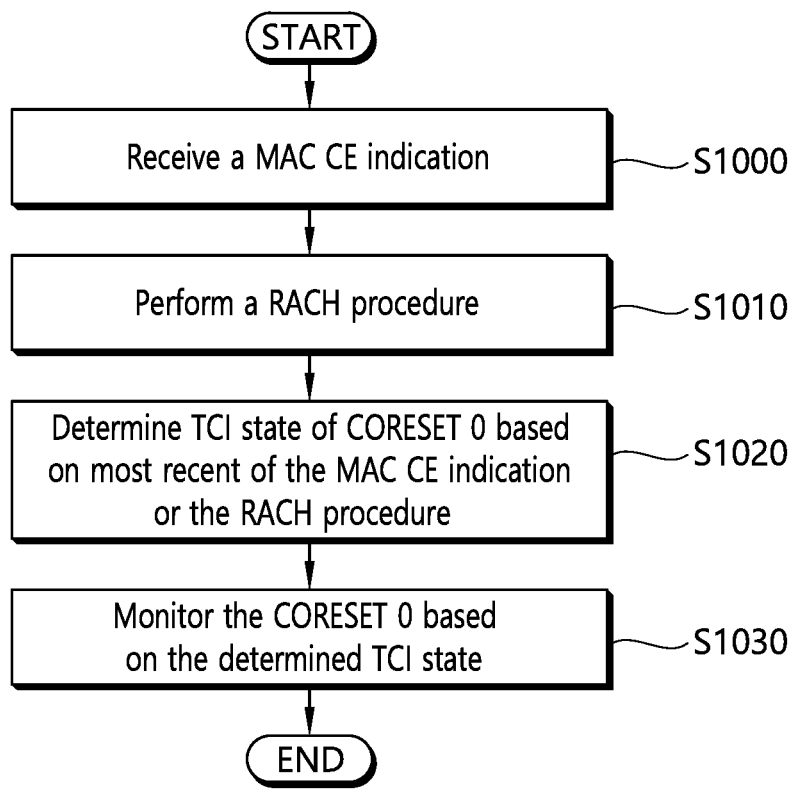
FIG. 10 shows a method for monitoring CORESET 0 according to an embodiment of the present disclosure.

FIG. 10 shows a method for monitoring CORESET 0 according to an embodiment of the present disclosure. Detailed descriptions of the present disclosure given above may be applied to the present embodiment.

In step S1000, the UE receives a MAC CE indication. In step S1010, the UE performs the RACH procedure. In step S1020, the UE determines the TCI state of CORESET 0 based on the most recent of the MAC CE indication or the RACH procedure. In step S1030, the UE monitors the CORESET 0 based on the determined TCI state.

The CORESET 0 may be a control region monitored to read RMSI. The TCI state may be associated with a beam and/or SS/PBCH block. The MAC CE may indicate a specific SS/PBCH block. The RACH procedure may be a contention-based RACH procedure. The contention-based RACH procedure may change the associated SS/PBCH block. The monitoring occasion of the search space #0 within the CORESET 0 may be based on the index of the SS/PBCH block corresponding to the determined TCI state.

The specific operation of the UE according to the embodiment above is as follows. If a value of 0 is provided (namely search space #0) for searchSpaceID in the PDCCH-Config-Common with respect to type0/0A/2-PDCCH CSS set, the UE determines a monitoring occasion for PDCCH candidates of the type 0/0A/2-PDCCH CSS set. For the DCI format CRC-scrambled by C-RNTI, the UE monitors the corresponding PDCCH candidates only at the monitoring occasion associated with the SS/PBCH block QCLed with a CSI-RS in the TCI state of an active BWP including the CORESET of index 0 (namely CORESET 0). At this time, the TCI state is determined by the most recent of the indication by a MAC CE activation command or a random access procedure not initiated by the PDCCH command that triggers a contention-free random access procedure (namely contention-based random access procedure).

According to one embodiment of the present disclosure described with reference to FIG. 10, the TCI state of CORESET 0 may be updated explicitly by the MAC CE or implicitly by the RACH procedure. More specifically, since CORESET 0 has to be readable by all of UEs, the TCI state may not be explicitly indicated by RRC signaling, and not only broadcast data but also unicast data such as MSG4 may also be scheduled through the CORESET 0. Therefore, as the most effective method for updating the TCI state of the CORESET 0, the most recent of the MAC CE or RACH procedure may be used.

(2) CORESET 1 (CORESET for RAR): If there exists a CORESET configured for RAR reception in the initial DL BWP, the QCL information about CORESET 1 may be determined similarly to how the QCL information is determined in the CORESET 0. The options that may be applied to CORESET 0 may also be used for CORESET 1.

(3) CORESET X in Each BWP Including CSS/USS

Option 1: Information about the TCI state may always be given by an explicit indication. Unless indicated explicitly, the UE does not change QCL/reception beam information about CORESET. Information about the TCI state may be provided by RRC and/or MAC CE.

Option 2: If a CORESET is configured as a beam recovery CORESET, an implicit QCL update may be used through a beam recovery procedure and/or beam management procedure. In other words, if a CORESET is indicated as a beam recovery CORESET, the beam recovery procedure may automatically update the QCL information. In this option, the TCI state may not be indicated for the corresponding CORESET through the MAC CE and/or RRC. Similarly, in the case of implicit update, too, additional explicit mapping that redefines implicit mapping may be allowed. If a beam recovery/management procedure changes the best beam after explicit mapping, QCL information may be updated. In other words, the most recent event of the implicit and explicit mapping may redefine the assumption about previous TCI state/QCL information.

Option 3: The QCL information may be changed only through RACH procedure. This option may be applied particularly to the case where the CORESET has CSS for RAR reception/RACH procedure. In other words, a UE-dedicated CORESET may be configured without association with explicit QCL information/TCI state. The QCL information/TCI state of the CORESET may be updated according to the RACH procedure similarly to as in the CORESET 0. However, other CORESETs may not be configured as having a multi-beam similarly to how the CORESET 0 is configured. In the case of RA-RNTI, it may be preferable to associate the QCL information/TCI state with the RACH procedure. In the case of SI-RNTI, as long as the CORESET 0 is not used, a UE-specific CORESET may be associated with explicit QCL information/TCI state. For example, in the SCell configuration or handover, a UE-specific CORESET may have the same beam sweeping attribute in the PCell as the CORESET 0. In one simple approach, for the sake of SCell configuration or handover, the CORESET 0 may be made to always have the same attributes as those of the PCell. In other words, the CORESET 0 may be reserved for a beam sweeping search space based on the associated SS/PBCH block index. In the same way as the option 2, an additional explicit indication may also be considered for this option. In other words, in the case of a CORESET without a configuration for the TCI state, the same operation as in the CORESET 0 may be used (except for the beam recovery CORESET). While SI-RNTI/P-RNTI for a UE in the idle state may define QCL information based on the latest optimal beam or appropriate best beam, it may be assumed that other RNTI (for unicast transmission such as used for RAR, MSG4, and C-RNTI) is QCLed with the SS/PBCH block or CSI-RS index used in the most recent RACH procedure. While this operation (or beam sweeping assumption) may be applied only to the frequency range 2 (namely higher than 6 GHz), a specific assumption about QCL and SS/PBCH block index may not be applied for the frequency range 1 (namely less than 6 GHz).

Option 4: QCL information may be changed through the RACH procedure and/or beam recovery/management procedure. In the same way as in the option 2, an additional explicit indication may also be considered for this option.

Option 5: The TCI state may be configured for CORESET X (and CORESET 0/1). The TCI state may be applied only to the USS while the TCI state for the CSS may not be used. In the case of CSS, QCL information based on the SS/PBCH block or CSI-RS may be used.

Option 6: The TCI state may exist at least only for a CORESET related to the USS. In other words, if there is no CSS associated with a CORESET, the UE may be configured as being in the TCI state.

Option 7: The TCI state has to be configured for a CORESET that does not have a beam sweeping search space (for example, a PBCH based CORESET configuration without the TCI state). To determine a beam sweeping search space, an explicit indication may be used in a search space, or a search space configuration based on RMSI-searchspace-config used for a PBCH may be regarded as the beam sweeping search space. A configuration based on an explicit search space in a format different from the one used in the PBCH may be regarded as a non-beam sweeping search space. According to the format or scheme by which a search space is configured, the TCI state may or may not exist. The QCL assumption may be determined based on the SS/PBCH block and/or CSI-RS. In the case of CORESET related to the non-beam sweeping search space, the TCI state may exist. Or, the TCI state may be determined according to the CORESET configuration. If the PBCH CORESET pattern is used, it may be regarded as a beam sweeping CORESET or associated with a beam sweeping search space.

Option 8: The TCI state may be configured. If the TCI state is not configured, the RACH procedure may be performed to update the TCI state. In the case of CORESET in which RMSI/OSI or RAR/MSG4 or paging is scheduled, an option similar to the one used in the CORESET 0 may be used.

In the case of CORESET without the TCI state, the following operations may be considered.

Option 1: The smallest TCI state among configured TCI states (per UE) may be used. In other words, among TCI states configured for a UE per cell, the TCI state with the lowest index may be used for the corresponding CORESET.

Option 2: Similarly to how the CORESET 0 operation is performed, QCL information may be determined based on the SS/PBCH block and/or CSI-RS.

Option 3: Different operations may be applied to CORESET 0/1 (for RAR) and other CORESETs different from the CORESET X (CSS for SI-RNTI, P-RNTI, and RA-RNTI) (for example, option 2 for CORESET 0/1 and option 1 for other CORESETs).

(4) CSS/CORESET Configured for the Initial DL BWP and Other BWPs for RAR, RMSI, and Others Option 1: If CORESET 0 (and/or CORESET 1 configured by RMSI) is not reconfigured as a new BWP, the TCI state of a configured CORESET may be configured the same as the TCI state of other CORESETs with respect to the USS. CORESET 0 (and/or CORESET 1 configured by RMSI) may inherit the attributes of CORESET 0/1 in the initial DL BWP.

Option 2: Different TCI states (dedicated TCI or implicit mapping for the best beam such as CORESET 0) may be configured for CORESETs. Depending on the configuration, appropriate assumptions may be performed.

Option 3: A plurality of search spaces/a set of CORESETs may be configured. One CORESET may be dedicated to one TCI state (or SS/PBCH block index). A CORESET configuration may be duplicated, and a search space related to each CORESET may have a different monitoring occasion.

Option 4: An option similar to the one for CORESET 0 may be applied.

Option 5: TCI state/QCL assumption may be determined in slot units according to the CORESET/search space to be monitored by a UE.

(5) Beam Recovery CORESET

QCL information may be updated automatically through the beam recovery procedure. The same CORESET may be allowed to be configured with different RNTI such as RA-RNTI, P-RNTI, or SI-RNTI. In other words, a field may be indicated within a CORESET configuration, which indicates whether the CORESET is used for beam recovery. If a CORESET is configured as a beam recovery CORESET, an explicit update for additional QCL information through RRC and/or MAC-CE may also be considered. Similarly, the TCI state for the beam recovery CORESET may not be used, and the same CORESET used in a CSS for SI-RNTI and RA-RNTI may be reused for the beam recovery CORESET. After beam recovery, QCL information may be updated according to the beam recovery procedure.

The beam recovery CORESET may be monitored based on a configured search space set.

Or, whether explicit QCL information is provided may be used. If a CORESET is configured explicitly together with QCL information, the CORESET may be regarded as a non-beam recovery CORESET, and for this CORESET, QCL information may be changed only through an explicit configuration. If QCL information is not provided explicitly, a CORESET may be regarded as a beam recovery CORESET, and for this CORESET, QCL information may be automatically updated through the beam recovery procedure and/or RACH procedure (when RA-RNTI is configured for the corresponding CORESET/search space set).

The CORESET configured for the RACH procedure may also be used for the beam recovery CORESET. For this CORESET, the beam recovery/RACH procedure may always change the best beam/QCL information.

In the case of a CORESET of each BWP, which is regarded as a beam recovery CORESET, or a CORESET automatically updated through the RACH procedure and/or beam recovery procedure, QCL information may be updated irrespective of whether an associated BWP is activated. In other words, QCL information of the corresponding CORESET may be maintained independently of the state of the corresponding BWP. Or, if a new BWP is activated, QCL information of the corresponding CORESET may be automatically updated based on the current, best beam information. In this way, the best beam information may be inherited irrespective of change of BWP. Unless explicit QCL information is provided, QCL information may be inherited from the initial DL BWP to another DL BWP or UL BWP. In other words, CSS of a CORESET of a BWP may inherit QCL information from CORESET 0/1 or beam recovery CORESET. For example, if a current BWP has a CORESET for beam recovery, QCL information of the corresponding CORESET may be inherited as a new CORESET of a new active BWP (at least as a CORESET for beam recovery of a new active BWP). At this time, one of the following options may be considered.

Option 1: Only the CORESET for the beam recovery procedure may update/inherit QCL information from a beam recovery CORESET of a previous active BWP.

Option 2: QCL information may be updated so that all of CORESETs of a new BWP are aligned with beam recovery CORESETs of a previous BWP. Explicit RRC and/or MAC CE may update the TCI state of each CORESET.

Option 3: TCI state may always be updated based only on an explicit indication.

If a beam recovery procedure or contention-based RACH procedure occurs, a CORESET indicated by the index of an SS/PBCH block, which was the best beam before, may be reconfigured, but CORESETs related to other SS/PBCH blocks may not be reconfigured. Or, unless an associated SS/PBCH block or CSI-RS exceeds particular quality, the TCI state for a CORESET may not be updated during the beam recovery procedure, and the UE doesn't have to monitor any CORESET.

(6) TCI State for PUCCH Transmission

If a beam recovery procedure is performed or RACH procedure occurs, and a downlink beam or index of the best downlink SS/PBCH block is changed, uplink beam information may also need to be changed. If beam correspondence is assumed, downlink beam change may also trigger uplink beam change. Since an RACH preamble may be transmitted via a different beam in the uplink, if the RACH preamble is transmitted via a different beam, basic uplink QCL information/TCI state may be automatically updated. In other words, MSG3 and other subsequent uplink transmission may comply with RACH preamble transmission or in the case of beam recovery procedure, RACH preamble transmission. A default beam may also be configured.

(7) TCI State for Transmission of Configured PUSCH

An explicit beam may be indicated. Basically or if an explicit beam is not configured, the same beam used in a PRACH and/or a default beam may be used for uplink transmission.

(8) UL Coordinated Multi-Point (CoMP) Transmission

Uplink transmission may also be transmitted to different Transmission Reception Points (TRPs) used by different QCL information. At this time, different approaches may be considered, as follows.

Beam is indicated only for the PUSCH, and PUCCH may comply with the same beam/QCL information as in the recent PRACH transmission.

QCL information may be configured for each ACK/NACK resource indicator (ARI) or HARQ-ACK resources. Part of HARQ-ACK resources may not be directly associated with QCL information but may be updated based on the RACH procedure. If an explicit configuration is available, an indicated HARQ-ACK resource may use associated QCL/beam information.

(9) Relationship Between CORESET 0 and Beam Recovery CORESET

There exists a similarity between CORESET 0 and beam recovery CORESET in that QCL information is not explicitly determined but determined implicitly according to the initial access or beam recovery procedure. CORESET 0 may be used as a beam recovery CORESET for the beam recovery procedure at least through contention-based access.

Since a beam-swept CORESET may also be configured in the initial DL BWP or non-initial DL BWP configured by UE-specific RRC signaling, QCL information of the CORESET needs to be clarified according to whether beam sweeping has been performed. Currently, the QCL information may be configured for each CORESET, and QCL information of CORESET 0 may be determined implicitly according to the relationship between a detected SS/PBCH block and the CORESET. If the network and UE are not aligned towards the optimal beam direction, particularly due to long periods of inactivity, it may be necessary to fall back by performing the beam sweeping operation. To this end, at least one of the following may be considered.

(1) If there is no active TCI state, a UE may return to the initial DL BWP. The UE may be implicitly configured/associated with the best SS/PBCH block in which only CORESET 0 has been detected. In each TCI state, if the TCI state is activated, an associated timer may be started. The timer may be updated whenever the UE receives an arbitrary control signal related to an active TCI. If the UE does not receive any control signal from an active TCI for a predetermined time period, the TCI state may be deactivated. If there is no active TCI state, the situation may be regarded as 'no active TCI state', and the UE may fall back to the initial CORESET 0 or initial DL BWP. If the UE is not configured with CORESET 0 in the current active DL BWP, the UE may return to the initial BWP for CORESET 0. Or, in this case, a beam recovery CORESET may be used as CORESET 0. The UE may perform measurement based on the SS/PBCH block and use a beam recovery CORESET based on the detected best SS/PBCH block. Also, if there is no designated beam or transmission QCL in the uplink transmission, the UE may return to the initial UL BWP.

(2) The UE may be configured with a CORESET, and TCI state of the CORESET may be determined by a detected SS/PBCH block. In the same way as CORESET 0, a separate CORESET may be configured together with TCI state and/or beam sweeping. The TCI state of a CORESET may depend on the detected SS/PBCH block. In other words, in each search space occasion, the TCI state may be implicitly mapped to the SS/PBCH block index similarly to how CORESET 0 mapping is performed. To determine which search space occasion is associated with which SS/PBCH block, a configuration mechanism similar to the one for RMSI/OSI/paging search space may be taken into consideration. For example, the number of search space occasions that may be included into a slot and/or mapping between SS/PBCH block index and search space monitoring occasion may be defined by the configuration. The CORESET may be determined as a beam recovery CORESET. Or, unless the QCL information is explicitly configured, the beam recovery CORESET may comply with the QCL information of the detected SS/PBCH block.

(3) QCL information of each CORESET may be optional. If QCL information is unavailable, QCL information of each CORESET may comply with a detected SS/PBCH block.

(4) If a default BWP is supported, a CORESET similar to CORESET 0 with respect to the QCL information may be configured in a BWP. If a default BWP is configured, a beam sweeping CORESET may be configured for the default BWP. Otherwise, the UE may return to the initial DL BWP. In other words, the beam sweeping CORESET may be configured for the default BWP. A CORESET may be particularly indicated as having no other CORESET configuration or QCL information. Or, all of CORESETs of the default BWP may be associated with a detected SS/PBCH block. Or, a CORESET with the lowest index may be associated with the detected SS/PBCH block.

(5) If an active BWP of a UE does not have a beam sweeping CORESET for fallback, a RACH resource may not be configured in a current active DL BWP or RAR search space of the current active DL BWP. Therefore, it may be needed for the UE to return to the initial DL/UL BWP to perform the RACH procedure. If a timing advance (TA) timer of the UE expires, the UE may return to the DL/UL BWP and perform the RACH procedure. If a current BWP includes a RACH configuration, the UE may stay in the current active BWP. Otherwise, the UE may return to the initial DL/UL BWP.

In what follows, processing of CORESET 0 will be described in more detail. CORESET 0 may have a plurality of associated search spaces, and the TCI state of CORESET 0 may be updated based on the MAC CE from a configured TCI state set. If the TCI state of CORESET 0 is configured, the following option may be considered to search for the TCI state and a monitoring occasion of search space #0.

(1) Option 1: The monitoring occasion of search space #0 may always be based on the SS/PBCH block index used in the most recent RACH procedure. If a contention-free RACH procedure is triggered in the most recent RACH procedure, an associated SS/PBCH block with respect to a CSI-RS may be used for the SS/PBCH block index. If the CSI-RS is not associated with the SS/PBCH block, a previous monitoring occasion/association (namely a previously selected SS/PBCH block index) may be used, or it may be considered to be an error. If a MAC CE indicates the TCI state, the TCI state of CORESET 0 including search space #0 may follow the update due to the MAC CE. Otherwise, the TCI state of CORESET 0 including search space #0 may comply with the QCL information of the SS/PBCH block index used in the most recent RACH procedure.

(2) The monitoring occasion of search space #0 may be based on the SS/PBCH block index used in the most recent RACH procedure or TCI state updated by a MAC CE. If TCI state is updated by a MAC CE, an associated SS/PBCH block index may be used. If there is no associated SS/PBCH block, an SS/PBCH block index which has been used in the most recent RACH procedure may be used, or it may be considered to be an error. The TCI state may be updated only by the MAC CE.

The monitoring occasion of search space #0 may be based on the SS/PBCH block index used in the most recent RACH procedure or TCI state updated by a MAC CE. If TCI state is updated by a MAC CE, an SS/PBCH block index associated with a designated TCI may be used. If there is no associated SS/PBCH block, an SS/PBCH block index which has been used in the most recent RACH procedure may be used, or it may be considered to be an error. The TCI state may be updated based on the most recent RACH procedure or update of the MAC CE. In the case of the RACH procedure based on an SS/PBCH block, the TCI state may be updated based on the SS/PBCH block used in the RACH procedure (namely, based on the QCL assumption for an SS/PBCH block used through the RACH procedure).

To summarize, if the TCI state is configured to CORESET 0, the monitoring occasion of search space #0 may be determined as follows.

The monitoring occasion may comply with the RACH procedure based on SS/PBCH blocks (including a RACH procedure based on a CSI-RS associated with an SS/PBCH block), or The monitoring occasion may follow the index of the most recent SS/PBCH block index derived from the most recent of the RACH procedure or MAC CE update.

In determining the TCI state, the following may be considered.

Always comply with a MAC CE (for the case where a MAC CE is available or activated), or Comply with the most recent event of the RACH procedure or MAC CE (although the RACH procedure is in a QCL relationship with the TCI state, QCL information may be updated according to the RACH procedure when the TCI state is not defined).

As described above, defining a monitoring occasion of search space #0 according to the SS/PBCH block index may be limited to the case when the search space #0 is associated with CORESET 0. If the search space #0 is associated with another CORESET rather than CORESET 0, it may be considered that the QCL information associated with the same search space is changed. And if the search space #0 is associated with CORESET 0, since QCL information is designated (mapped) to each monitoring occasion of the search space #0, it may be understood that the monitoring occasion of the search space #0 has also to be changed when the QCL information is changed.

2. Beam Recovery and Wideband Operation

In view of beam recovery procedure, if resources related to beam recovery are not configured, a beam management/recovery procedure may occur in the current active DL/UL BWP. During the beam recovery procedure, DL/UL BWP switching may not occur, and a UE may ignore a BWP switching DCI during the beam recovery procedure.

At the time of BWP switching, the UE may report feedback on the best beam when triggered. Alternatively, at the time of BWP switching, if the best beam is changed, the UE may trigger a recovery request. The UE may perform a beam management procedure and/or beam recovery procedure (if necessary) at the time of BWP switching. This may be explicitly triggered by a BWP switching command.

If a RACH resource is configured for each BWP, only a subset of RACH resources may be used among available beams. In this case, there may not exist a RACH resource associated with the best SS/PBCH block detected during a contention-based RACH procedure. In this case, it may be considered that a current BWP does not have a RACH resource. Therefore, a UE may return to the initial DL/UL BWP to perform the RACH procedure. In other words, in the absence of a RACH resource for an SS/PBCH block detected for transmission of a RACH preamble, the UE may return to the initial DL/UL BWP.

Also, to minimize the case in which a beam recovery CORESET/search space is not monitored due to beam recovery procedure channel estimation/limitation of blind decoding, the followings may be considered.

(1) A search space set related to a beam recovery CORESET may have the highest priority (if not associated with the beam recovery CORESET, higher priority than CSS)

(2) While a search space set related to a beam recovery CORESET is monitored, the UE may not have to monitor the CSS.

(3) A CSS may be configured for a beam recovery CORESET so that the beam recovery CORESET/search space may always be monitored.

3. DCI Size/Format Handling in BWP Switching DCI

Table 5 shows the DCI format 1_1. Table 5 shows whether the size of each field of the DCI format 1_1 may be changed according to BWP.

TABLE 5

| Field | Whether size is changed via BWP |
| --- | --- |
| Carrier indicator | Since cross carrier scheduling is based on cell units, it is considered to be fixed. |

TABLE 5-continued

| Field | Whether size is changed via BWP |
|---|---|
| Identifier for DCI formats | Considered to be fixed. |
| Bandwidth part indicator | Considered to be fixed. |
| Frequency domain resource assignment | Variable. May follow the DCI field size of a current BWP. |
| Time domain resource assignment | Variable. May follow the DCI field size of a current BWP. |
| VRB-to-PRB mapping | If resource allocation is different between current and new BWPs, this field size may be changeable. If the current BWP does not include this field, and RA type 1 is used in a new BWP (for example, with or without hopping), the default configuration may be used. If the current BWP includes this field, but the new BWP does not include this field, this field may be regarded as a virtual Cyclic Redundancy Check (CRC) or may not be used. |
| PRB bundling size indicator | This field may be processed similarly to how the VRB-to-PRB mapping field is processed. If this field is not included in the current DCI, the default configuration may be used. Otherwise, this field may be regarded as a virtual CRC. |
| Rate matching indicator | Variable. Size of this field may be fixed to the maximum value among configured BWPs. |
| Zero-power (ZP) CSI-RS trigger | Variable. Size of this field may be fixed to the maximum value among configured BWPs. |
| For transmission block (TB) 1:<br>Modulation and coding scheme (MCS): 5 bits<br>New data indicator (NDI): 1 bit<br>Redundancy version (RV): 2 bits | Considered to be fixed. |
| For TB 2 (only present if Number-MCS-HARQ-DL-DCI equals 2):<br>MCS: 5 bits<br>NDI: 1 bit<br>RV: 2 bits | Variable. If this field does not exist in the current DCI, the second TB may not be scheduled on the new BWP even when Number-MCS-HARQ-DL-DCI is 2. If this field exists in the current BWP, and the new BWP does not require this field, this field may be fixed to a known value. |
| HARQ process number: 4 bits<br>Downlink Assignment Index (DAI):<br>4 bits: If more than one serving cells are configured in the DL, and higher layer parameter HARQ-ACK-codebook = dynamic (where 2 Most Significant Bit (MSB) bits are the counter DAI, and 2 Least Significant Bit (LSB) bits the total DAI);<br>2 bits: Only one serving cell is configured in the DL, and higher layer parameter HARQ-ACK-codebook = dynamic (where 2 bits are counter DAI)<br>Otherwise, 0 bits.<br>Transmit power command (TPC) for scheduled PUSCH: 2 bits<br>PUCCH resource indicator: 2 bits<br>PDSCH-to-HARQ feedback timing indicator: 3 bits<br>SRS request:<br>2 bits: For UEs in which Supplemental UL (SUL) is not configured<br>3 bits: Used in the cell for UEs in which SUL is configured (the first bit is the non-SUL/SUL indicator).<br>DMRS sequence initialization | Considered to be fixed. |
| Antenna port(s): 4, 5, or 6 bits | Variable. If size of a current DCI is different from that of a new DCI, this field may be truncated or padded. |
| Transmission configuration indication (TCI) | Considered to be fixed. Or, if this function is configured for each BWP, size may be changed. If this field is not defined in a new BWP, the default configuration may be used. |
| Code block group (CBG) transmission information (CBGTI) | If CBG is configured for each BWP, size of this field may be changed. If a different size is needed, and a new BWP requires a larger size than the current BWP, this field may fall back with respect to the corresponding TB via TB-based transmission. If the new BWP requires a smaller size than the current BWP, unused bits may be filled with 0s. |

TABLE 5-continued

| Field | Whether size is changed via BWP |
|---|---|
| CBG flushing out information (CBGFI) | If this field is configured for each BWP, and the current DCI is not defined in this field, it may be assumed that there is no flushing in a new BWP with respect to the corresponding TB. |

Table 6 shows the DCI format 0_1. Table 6 shows whether the size of each field of the DCI format 0_1 may be changed according to BWP.

TABLE 6

| Field | Whether size is changed via BWP |
|---|---|
| Carrier indicator: 0 or 3 bits<br>UL/SUL indicator:<br>0 bit: For UEs not configured with SUL in the cell or UEs configured with SUL in the cell but configured in the cell so that only PUCCH carrier is configured for PUSCH transmission<br>1 bit: For UEs configured with SUL in the cell<br>Identifier for DCI formats: 1 bit<br>Bandwidth part (BWP) indicator: 0, 1, 2 bits. The bitwidth for this field is determined by the higher layer parameter for PUSCH, BandwidthPart-Config. | Considered to be fixed. |
| Frequency domain resource assignment | Variable. May follow the DCI field size of a current BWP. Mul_hop may be determined based on a new BWP. |
| Time domain resource assignment | Variable. May be fixed to the maximum value among configured BWPs. Or, if only limited time domain resources are indicated for the new BWP, this field may be truncated. In order to allow BWP switching delay, if truncation is used, an item with the largest index may be selected. |
| VRB-to-PRB mapping/Frequency hopping flag | If resource allocation is different between current and new BWPs, this field size may be changeable.<br>If the current BWP does not include this field, and RA type 1 is used in a new BWP (for example, with or without hopping), the default configuration may be used.<br>If the current BWP includes this field, but the new BWP does not include this field, this field may be regarded as a virtual Cyclic Redundancy Check (CRC) or may not be used. |
| Modulation and coding scheme: 5 bits<br>New data indicator: 1 bit<br>Redundancy version: 2 bits<br>HARQ process number: 4 bits<br>TPC<br>SRS resource indicator<br>SRS request | Considered to be fixed for each component carrier (CC). |
| 1st DAI 2nd DAI: 0 or 2 bits | May differ according to BWP. If different BWPs are allowed to have different configurations, a maximum value may be used. |
| Precoding information and number of layers | May use the maximum value among configured BWPs or may use truncation if a code set is selected for the first item. |
| Antenna ports | May use the maximum value among configured BWPs or may use truncation if a code set is selected for the first item. |
| CSI request | If bit size is not sufficient, this field may not be used. Otherwise, the field size of a current DCI may be used. Or, the same configuration may be considered throughout BWPs. |
| CBGTI | If CBG is configured for each BWP, size of this field may be changed. If a different size is needed, and a new BWP requires a larger size than the current BWP, this field may fall back |

TABLE 6-continued

| Field | Whether size is changed via BWP |
|---|---|
| | with respect to the corresponding TB via TB-based transmission. If the new BWP requires a smaller size than the current BWP, unused bits may be filled with 0s. |
| Phase tracking RS (PTRS)-DMRS association | May differ for each BWP. If padding bits are available, bit size may be increased (for the case where a new BWP requires a larger size than a current BWP). Otherwise, field size at the current DCI may be used. If 0 bit is allocated even when the new BWP requires 2 bits, a default PTRS configuration may be selected without an indication (namely, a default value may be used in the new BWP). |
| Beta offset indicator | If the beta offset indicator for the new BWP is shorter than requested, it may be assumed that piggyback is not allowed for the corresponding PUSCH. Otherwise, a general procedure may be used. |
| DMRS sequence initialization | May be used when padding bits are available. Otherwise, if the required bit size is larger than the size of a current DCI field, it may be assumed that PUSCH-tp is made available or a default value may be used (for example, in the case of PUSCH-tp, the first entry is made unavailable). |

Or, BWP switching DCI may be processed together with fallback DCI by the following operation.

(1) Option 1: An approach similar to Semi-Persistent (SP)-CSI/Semi-Persistent Scheduling (SPS) activation and/or DCI processing may be performed. However, only the field shared between fallback DCI and non-fallback DCI may be interpreted, and other fields may be ignored. If a BWP index is changed, the UE may ignore the field not included in the fallback DCI. For robust interpretation, the code point/MCS used for this case may be fixed, and MCS value may be set to '00000' together with a BWP change index. Or, a frequency domain and/or time domain resource allocation field may be fixed to a specific value.

For example, to improve stability, additional code points as shown in Table 7 below may be considered for BWP switching DCI.

TABLE 7

| Field | DCI format 0_0/0_1 | DCI format 1_0 | DCI format 1_1 |
|---|---|---|---|
| TPC command for scheduled PUSCH | Set to '00' | N/A | N/A |
| MCS | MSB is set to '0' | MSB is set to '0' | For the enabled TB: MSB is set to '0' |
| Redundancy version | Set to '11' | Set to '11' | For the enabled TB: Set to '11' |

More specifically, only the UL/SUL Carrier Indicator Field (CIF), BWP index field, and the field contained in the fallback DCI may be interpreted for this option.

The sizes of fields of DCI format 0-1 and 1-1 in the USS may all be determined by the current BWP. Data transmitted from a BWP may be indicated by a BWP index. If the BWP index activates other BWP, the frequency domain and/or time domain resource assignment field may be converted as follows.

To match the new BWP, zeros may be filled for bits that are too small.

To match the new BWP, bits that are too large may be truncated.

In the case of dynamic type 0/type 1 indication, type indication bits (part of frequency/time domain resource assignment field) may be excluded from padding/truncation. Padding/truncation may be performed in the MSB.

Also, common fields between the DCI format 1_0 and 1_1 (for example, ID, MCS, NDI, RV, HARQ ID, DAI, TPC, PUCCH ARI, and HARQ timing) may be applied to BWP switching DCI. Other fields except for the BWP index (for example, rate matching, ZP-CSI-RS, TB2, antenna port, TCI, SRS request, CBG, and DM-RS) may be ignored in the BWP switching DCI.

Also, common DCI fields between DCI format 0_0 and 0_1 (for example, ID, MCS, NDI, RV, HARQ ID, and TPC) may be applied to the BWP switching DCI. Other fields except for the BWP index (for example, TB2, SRI, precoding, and CBGTI) may be ignored in the BWP switching DCI.

Also, part of the fields may be configured with predetermined values to indicate whether to ignore the remaining fields except for the common fields between the fallback DCI and non-fallback DCI. For example, if the second TB is not used or MCS and RV of the second TB are a set of specific values (for example, '00000' and '11'), it may be regarded as ignoring the fields not existing in the fallback DCI. This is to avoid a problem of misinterpreting the fields within the DCI format. If the network is unable to transmit the corresponding field within the DCI format properly, the network may trigger the corresponding field to be ignored.

Although other fields within the DCI format may be reused, the second TB (if configured) may be regarded as an option. The code point that enables this operation has to be different from the code point that disables the second TB, and the case where the second TB is disabled needs to be distinguished from the case of BWP switching fallback. In other words, the present disclosure may propose a BWP switching fallback mode in which only the fields common to the BWP switching DCI and fallback DCI are considered to be valid while other fields are ignored.

(2) Option 2: An approach similar to SP-CSI/SPS release and/or DCI processing may be performed. If a BWP switching command is used (namely, the case where a BWP index is used differently from a previous command), BWP switching DCI may be configured as shown in Table 8 below.

TABLE 8

|  | DCI format 0_1 | DCI format 1_1 |
|---|---|---|
| TPC command for scheduled PUSCH | Set to '00' | N/A |
| HARQ process number | All set to '0' | All set to '0' |
| MCS | All set to '1' | For the enabled TB: set to all '1's |
| RV | Set to '00' | For the enabled TB: set to '00' |
| Frequency domain resource assignment | If higher layer configures RA type 0 only, set to all '0's; If higher layer configures RA type 1 only, set to all '1's; If higher layer configures dynamic switching between RA type 0 and 1, set to all '0's when MSB is '0', otherwise set to all '1's | If higher layer configures RA type 0 only, set to all '0's; If higher layer configures RA type 1 only, set to all '1's; If higher layer configures dynamic switching between RA type 0 and 1, set to all '0's when MSB is '0', otherwise set to all '1's |

Also, one of the fields, such as TPC field, may be used for the BWP index. In other words, fields other than the TPC field may be configured as above, and the BWP index may be interpreted from the TPC field and may be assumed as a BWP switching command. If a UE receives the BWP index, the UE regards the received BWP index as BWP switching DCI and performs BWP switching in a scheduled time domain resource. In other words, k1/k2 value may be used for BWP switching interval.

4. DCI Size/Format Handling for Grant-Free Activation/Deactivation/Retransmission In the absence of grant, the DCI format may be used for activation/deactivation/retransmission. Since a grant-free configuration may have different configurations in terms of resource allocation type, waveform, Resource Block Group (RBG) size, and so on, clarification may be needed for particular configurations. The following specifics may be considered.

If Configured Scheduling (CS)-RNTI (RNTI for grant-free configuration) and C-RNTI are configured to share the same search space set, it may be assumed that the UE use the same DCI format/size. If grant-free configuration and grant-based UL grant use different configurations, a grant-based DCI format may determine DCI field size for activation/deactivation. In the same way as the BWP switching described above, if the size of a desired field is larger than the size of a current DCI field due to UL grant, truncation may be considered.

The DCI size of UL grant may be determined by the larger value between the DCI size for CS-RNTI and DCI size for C-RNTI. For each BWP, size of the UL grant may differ depending on a grant-free configuration and grant-based configuration, respectively. Depending on the employed RNTI, different mapping may be considered. In this case, DCI size for CS-RNTI may be determined based on the grant-free configuration (even for retransmission).

The same configuration may be used for the grant-free configuration and grant-based UL transmission. For example, waveform (which may differ according to the DCI format used for activation/retransmission)/resource allocation type/MIMO-related parameter may be the same for each DCI format used for grant-based or grant-free activation.

In other cases, the same processing of DCI field between switching of BWPs may be used for grant-free activation and regular scheduling. Similar handling as in the resource assignment may be used between grant-free configuration based activation DCI and grant (for example, truncation or padding to match the resource assignment field size for grant).

Grant-free activation may be applied only to a currently active BWP. The activation BWP index may not be used for activation (namely, BWP index is ignored).

Or, grant-free activation may be used for BWP switching. After applying processing of BWP switching, resource assignment may be determined by a new BWP. Or, if BWP switching does not actually occur, a BWP index may be used. Activation/release may indicate only a target BWP, and activation/release may be performed without BWP switching.

5. Handling Collision Between CORESET and SS/PBCH Block

If an SS/PBCH block collides with CORESET, the following options may be considered.

In a monitoring control channel, at least for CORESET 0, puncturing may be considered. A control channel may be monitored under the assumption that there is no transmission of an SS/PBCH block, and actual transmission of an SS/PBCH block may puncture the control channel. If the UE knows the actually transmitted SS/PBCH block, the UE may assume that an RE overlapping the SS/PBCH block is punctured. This option monitors a search space of a CORESET without considering collision with an SS/PBCH block.

If a UE monitors SI-RNTI in a CORESET indicating that SI has been updated, the UE may assume that there is no SS/PBCH block transmission at the monitoring occasion.

The case where a UE is composed of a transmitted cell-specific SS/PBCH block and transmitted UE-specific SS/PBCH block and the case where the UE skips a candidate overlapping an SS/PBCH block (including an empty RE of an SS/PBCH block) may be performed based on a UE-specific SS/PBCH block. Or, skipping a rate matching/candidate may be performed based on a cell-specific SS/PBCH block for at least CORESET 0 but may be performed based on a UE-specific SS/PBCH block for other UE-specific CORESET(s).

6. Default Configuration

In the case of a CORESET configured in a UE-specific manner in a DL BWP for CSS monitoring, it is necessary to determine configuration for RBG size, scrambling parameter, and interleaver size. The following options may be considered for the configuration.

An explicit configuration may be considered. If a configuration is not given, the same parameter used for the initial DL BWP may be used or the same parameter configured for an active DL BWP may be used.

It may always be assumed that the same parameter used for the initial DL BWP is used.

It may always be assumed that the same parameter used for the active DL BWP is used.

It may always be assumed that the same parameter used/configured for the default DL BWP is used.

The following options may be considered for DM-RS mapping, interleaver mapping, sequence generation, and RBG mapping for CORESET 0.

Irrespective of whether a UE monitors SI-RNTI for CORESET 0, it may always be assumed that the UE does not know common PRB indexing for the CORESET 0. In other words, it may be assumed that local PRB indexing is applied to the parameter/sequence. In this case, if USS is configured with CORESET 0, or CORESET 0 is re-reconfigured to a DL BWP (non-initial DL BWP) with the UE, the UE may have to apply a specific configuration for the CORESET 0.

The UE may monitor CORESET 0 in the initial DL BWP, and local PRB index may be assumed irrespective of which RNTI is monitored. Otherwise, the UE may assume CORESET 0 based on common PRB index for the configuration.

If UE monitors SI-RNTI, the UE may assume local PRB indexing. Meanwhile, mapping based on the common PRB indexing may be applied for other cases. Because of this, an ambiguity may arise among UEs sharing the CORESET 0 with or without an SIB updated.

If UE monitors a search space set configured for RMSI monitoring, the mapping may be performed based on local PRB indexing. If a separate search space set is configured for OSI/RAR/UE specific data, the mapping may be performed based on common PRB indexing. If a search space set configured with RMSI and other search space set collide with each other at the same time in the CORESET 0, the local PRB indexing may be used. This may also be applied to a search space set configured for RMSI with respect to other SS/PBCH block index in addition to the best beam and/or best SS/PBCH block index for a given UE.

In the case of SCell configuration from the option above, CORESET 0 may be configured with respect to the SCell by RRC. The same processing for PCell CORESET 0 may be used. In other words, CORESET 0 may also be reserved in the case of SCell for a special CORESET processed differently from other CORESETs.

When a CORESET overlapping the CORESET 0 in the time domain is configured, the following specifics may be considered to process the CORESET 0 differently. An RBG (6 RBs) partially or fully overlapping the CORESET 0 may not be used for CORESET configuration. In other words, the UE is not expected to be configured by being overlapped between the two. Or, if a search space set of a new CORESET overlaps a search space set configured for the CORESET 0 in the time domain, a candidate which overlaps the CORESET 0 may be skipped. This may be applied only to the case where a narrowband RS precoder is assumed for a new CORESET while a broadband RS precoder is assumed for the CORESET 0.

In the case of data scheduled by the CORESET 0, the following specifics may be considered for DM-RS mapping, interleaver, and so on.

Data may be scheduled based on local PRB indexing only for SI-RNTI. For other RNTI, data may be scheduled based on common PRB mapping/indexing.

All of the data scheduled by the CORESET 0 may follow the local PRB indexing.

Data is reserved based on local mapping only for the case of SI-RNTI with respect to RMSI readings. For other cases, data is scheduled based on general PRB mapping/indexing.

Data may be scheduled based on local PRB indexing only for the case of SI-RNTI with respect to RMSI readings. For other cases, data may be scheduled based on common PRB mapping/indexing.

For other CORESETs configured for a DL BWP of each UE to monitor SI-RNTI, the following options may be considered.

The UE may assume that the same processing applied to the CORESET 0 is applied to other CORESETs. In other words, general PRB indexing may not be available.

In case the UE detects an SI update or loses a beam, the UE may return to the initial DL BWP.

Regardless of RNTI monitored in the CORESET, the UE may assume common PRB mapping in a UE-specific CORESET. This may be based on the assumption that a reference point or common PRB indexing is not changed by the SI update with respect to a UE in a connected mode. If the network attempts to change the common PRB indexing, the network may release all the UEs before the update. Or, during the SI update, another state indicating an update of RMSI may be indicated to reveal whether an arbitrary parameter affecting the UE operation with respect to CORESET monitoring and/or common PRB indexing has been updated. If this is triggered, the UE may return to the initial DL BWP for SI update.

7. Handling the Case where UE Loses Synchronization

If the TA timer expires, the UE should not transmit any uplink traffic. Therefore, all of the operations related to uplink transmission may be stopped. This may be performed by deactivating a currently active BWP and/or releasing configuration of a PUCCH/scheduling request (SR) resource. Also, this indicates that the UE may lose synchronization (namely downlink synchronization). In the LTE, loss of uplink synchronization does not indicate the possibility of downlink synchronization loss. This is so because the UE maintains monitoring on the downlink and continues to maintain QCL relationship/synchronization based on a downlink signal. However, in NR, since the network operates on multi-beams, it is important to align the optimal beam between the UE and network. To address the problem, the following options may be considered.

(1) The UE may maintain synchronization based on a beam management procedure (namely tracks the optimal beam). If the beam management procedure detects a beam failure, the UE may trigger a Radio Link Failure (RLF) so that an appropriate handover procedure may be triggered. Or, the UE may return to the initial DL/UL BWP for SS/PBCH block based measurement and trigger the beam recovery procedure. In other words, the UE may initiate the SS/PBCH block-based beam recovery procedure.

(2) The TCI state may be reconfigured or returned to its original state. At this time, one of the following may be used.

The first item of a configured TCI state

SS/PBCH block index of the best beam

'No state' which indicates that the UE has to perform the initial beam combining procedure If the beam combining procedure is intended for PCell, the beam combining procedure may occur in the initial DL BWP. If the beam combining procedure is for a cell rather than the PCell in which the initial DL BWP is unclear, the UE may assume that the first activated DL BWP includes beam sweeping related information. The location and related information of an SS/PBCH block may be indicated by the PCell. Also, in the Primary SCell (PSCell)/SCell configuration, the initial DL BWP, through which the UE accesses the corresponding cell as the PCell, may be indicated as the first activated DL BWP In the case of a carrier without an SS/PBCH block, beam recovery may be impossible at the corresponding carrier. Therefore, not all of processing for beam recovery may be assumed. Also, the beam recovery procedure may be performed through the PCell, and downlink may be managed through the beam recovery procedure or the aforementioned procedure. In other words, if the situation occurs in an arbitrary PSCell or SCell, the network may initiate a PDCCH command from the PCell through cross carrier scheduling.

Now, beam carrier group will be described. The beam recovery procedure may be performed for each carrier set rather than for each carrier. For example, in the case of intra-band contiguous/non-contiguous CA, it is preferable to align beams among carriers. In this case, it is better to maintain the TCI state for CORESET/beam recovery procedure jointly among carriers. Such a carrier group may be called a 'beam carrier group'. Like the timing advance group (TAG), there may be a basic cell for maintaining beams. If PCell belongs to a beam carrier group, the PCell may become the basic cell for maintaining beams. Otherwise, SCell having the lowest SCell index may become the basic cell for maintaining beams. Within the beam carrier group, TCI state/QCL information of each carrier may be maintained jointly. For this beam carrier group, a default BWP timer may also be operated jointly. For example, if a default BWP timer expires within one carrier, all the carriers may move to the default BWP or enter the dormant state. More generally, a carrier set may be grouped, and part of operations may be performed for each carrier group, not for each carrier. A series of functions/operations performed jointly may be configured. For example, a function/operation performed jointly may include a BWP switching operation, Discontinuous Reception (DRX) operation, beam management operation, CSI feedback operation, and handover. If one carrier within a carrier group is handed over, all of the other carriers may also be handed over or deactivated. Such a beam carrier group may be configured by the network based on the UE capability. For example, with respect to in-band and/or inter-band CA band combination, the UE may indicate, to the network, whether RF is shared so that RF-related operations may be performed jointly. Also, whether baseband capability is shared among carriers may be indicated so that scaling required for baseband processing may be applied.

To support a beam carrier group, the following options may be considered.

A PDCCH command triggered by another cell may be available only when cross carrier scheduling is configured for the corresponding cell.

A PDCCH command may be embedded into the MAC payload so that RACH procedure may be triggered by an upper layer of the UE.

A PDCCH command may include a field that indicates a carrier triggering the PDCCH command. Since the PDCCH command is needed only for the PCell or PSCell or SCell in which a PUCCH is configured, a maximum of 2 bits are sufficient to indicate the cell to transmit the PDCCH command. All of PDCCH command-related parameters may be based on a scheduled cell.

If a PDCCH command is triggered by another cell, a RAR may also be received by the cell. Or, there may be a special CORESET (for example, a CORESET with the lowest index or a CORESET with the lowest index among CORESETs related to a currently active DL BWP or a CORESET predefined or preconfigured for this purpose) used for RAR reception or RACH procedure. If a RAR is received by another carrier, the RAR has to include information about the best beam that the UE has to monitor and/or the TCI state. If a special CORESET is used, the TCI state of the corresponding CORESET may be configured based on a beam selected for the RACH procedure.

Since the network may not know the beam condition, beam index may not be given. If the network does not indicate the best beam in addition to the RACH preamble, the UE may select a RACH resource based on the current best beam. The UE may obtain RACH resources for all the beams available.

The UE may perform the RACH procedure in a non-initial UL BWP. To avoid this operation, if there is no associated beam indication, or the UE does not have a RACH resource with respect to an indicated beam, the UE may return to the initial UL BWP (and initial DL BWP) for the RACH procedure. Also, a PDCCH command may also indicate a BWP index at which the RACH procedure needs to occur.

Also, a RACH resource configured in a non-initial UL BWP may comply with the RACH resource configuration in the initial UL BWP. In other words, based on SS/PBCH block transmission, a beam swept RACH resource may be configured. Or, together with beam sweeping, a separate RACH resource may be considered.

To further simplify the procedure above, the following options may be considered.

(1) Option 1: If a UE loses a UL resource or TA timer expires, the UE may return to the initial DL/UL BWP or first activated DL/UL BWP (or DL/UL BWP indicated in a cell configuration to be spontaneously activated).

(2) Option 2: The TCI state of at least one CORESET may be maintained based on SS/PBCH block and may also be updated autonomously. In case beam synchronization is lost, the network may change the transmission beam on the CORESET.

(3) Option 3: At least one CORESET may be configured as a beam sweeping resource. Part of rules may be used, which map an SS/PBCH block index to each monitoring occasion of a CORESET. For example, by applying a rule similar to the one used for the RMSI CORESET to the CORESET, beam sweeping resources may be created.

A similar problem may occur in the DRX. In the case of DRX, beam management may be performed during DRX, or if DRX exceeds a predetermined threshold value (for example, 10 ms), the UE may return to the initial DL BWP for potential recovery. Or, in the default DL BWP, other beam sweeping resources may be configured.

If the network is able to initiate a plurality of PDCCH commands through a plurality of beams due to ambiguity for the best beam, the UE may transmit a RACH preamble based on the first received PDCCH command. If the RACH preamble is transmitted, the UE may cancel or ignore the PDCCH command until a RAR window.

Beam sweeping resources within the default DL BWP may be configured in a more efficient manner according to a transmitted SS/PBCH block. One example is described as follows.

The period of a CORESET with beam sweeping may be configured as T. Or each search space having a specific beam may have a periodicity according to which the same beam search space is generated.

The offset is calculated based on the SS/PBCH index within a transmitted SS/PBCH block, where the corresponding offset may be set to 0. For example, an offset step may be configured as K OFDM symbols, 1 slot, and so on. The offset of search space monitoring associated with each actually transmitted SS/PBCH block may be determined automatically based on the offset and period.

An explicit configuration of a CORESET/search space may be considered together with each SS/PBCH block index. In this case, in the absence of a resource for a specific SS/PBCH block index measured as the best beam at a given time, the UE may return to the initial DL BWP.

8. Beam Sweeping Search Space Set Configuration

In the case of a search space set for RMSI, OSI, paging, RAR, and so on, QCL information and/or TCI state about an associated CORESET may be determined implicitly or associated with an SS/PBCH block. A monitoring occasion may be determined based on the associated SS/PBCH block index. If the SS/PBCH block index is changed, a new monitoring occasion may be determined based on the rule. Such a CORESET/search space set may differ slightly from other UE-specific CORESET/search space set configured by explicit TCI state/QCL information. The initial access-related search space may be needed for beam switching, handover, and BWP switching. In this case, various options may be considered for search space configuration as follows. A beam swept CORESET/search space set may be configured as a default BWP.

(1) CORESET pattern #1, #2, and #3 may be used for configuration of CORESET. Also, a search space configuration for PBCH (including other multiplexing patterns) may also be reused. A CORESET may be configured as initial connection, and an offset from the corresponding SS/PBCH block may be used to determine the frequency position. In case the CORESET is configured according to this pattern, beam sweeping or implicit mapping between different monitoring occasions and SS/PBCH block indexes may be supported. Different numbers of maximum beams may be assumed for each frequency range. If CORESET 0 is configured with different frequencies in the broadband, it may be necessary to indicate the frequency position of an SS/PBCH block referenced from the configured CORESET 0.

(2) QCL state may be indicated by each CORESET configuration. Therefore, if QCL information/TCI state is explicitly configured by being associated with either SS/PBCH block or CSI-RS, it may be regarded as a dedicated CORESET. In the presence of QCL information/TCI state, a beam sweeping CORESET may be used. Also, whether implicit mapping to multiple SS/PBCH blocks is allowed may be explicitly configured. In this option, the same configuration may be used for CORESET configuration, and TCI state may indicate a different state. However, this option may not allow the CORESET 0 of a serving cell to be shared with other serving cells. Therefore, it may be considered to indicate whether a configured CORESET is CORESET 0 or not.

(3) If the configured CORESET is CORESET 0 (and/or CORESET 1 if configured by RMSI), implicit mapping of different monitoring occasions with respect to multiple SS/PBCH blocks may be supported. Also, regardless of the configuration by PBCH or other UE-dedicated SIB or UE-dedicated RRC, RGB mapping/sequence mapping of CORESET 0 may always be used in the CORESET 0.

(4) If RMSI configures different CORESETs, a beam-swept CORESET and UE-dedicated CORESET may be distinguished from each other by using the options mentioned above. Unless specified otherwise, the CORESET configured by the RMSI may be regarded as a beam-swept CORESET, and a monitoring occasion may be determined based on the associated SS/PBCH block/PRACH resource.

(5) A plurality of search space sets/CORESETs may be configured, and one search space set/CORESET may correspond to one of TCI states (or SS/PBCH block indexes). The CORESET configuration may be overlapped, and a search space associated with each CORESET may have a monitoring occasion different from each other.

(6) For a search space associated with CORESET 0, a beam sweeping search space may be configured according to the physical layer procedure. Regardless of whether the CORESET 0 is indicated by PBCH or UE-dedicated RRC signaling, at least CSS #0 for RMSI may be configured based on the physical layer procedure.

(7) In configuring CORESET 0, the following options may be considered.

In the case of CORESET 0, the same configuration for PBCH may be used. In other words, according to the frequency/time position of the SS/PBCH block, the CORESET 0 resource may be determined. Also, for frequency range, a PBCH configuration may be complied with (for example, numerology or numerology between an SS/PBCH block and RMSI may be determined).

A CORESET configuration of 6 PRB grids may be used, and an additional offset indicating an offset between local PRB indexing and common PRB indexing may be configured. In other words, 6 PRB grids may be configured, and if the offset is non-zero or exists, the CORESET may be configured based on local PRB indexing rather than based on the common PRB indexing. The starting PRB may be determined in the common PRB, and PRB indexing, scrambling, and sequence generation for the corresponding CORESET may be performed locally within the configured PRB. If the offset is not zero, only contiguous resource allocation is allowed.

Figure 11:
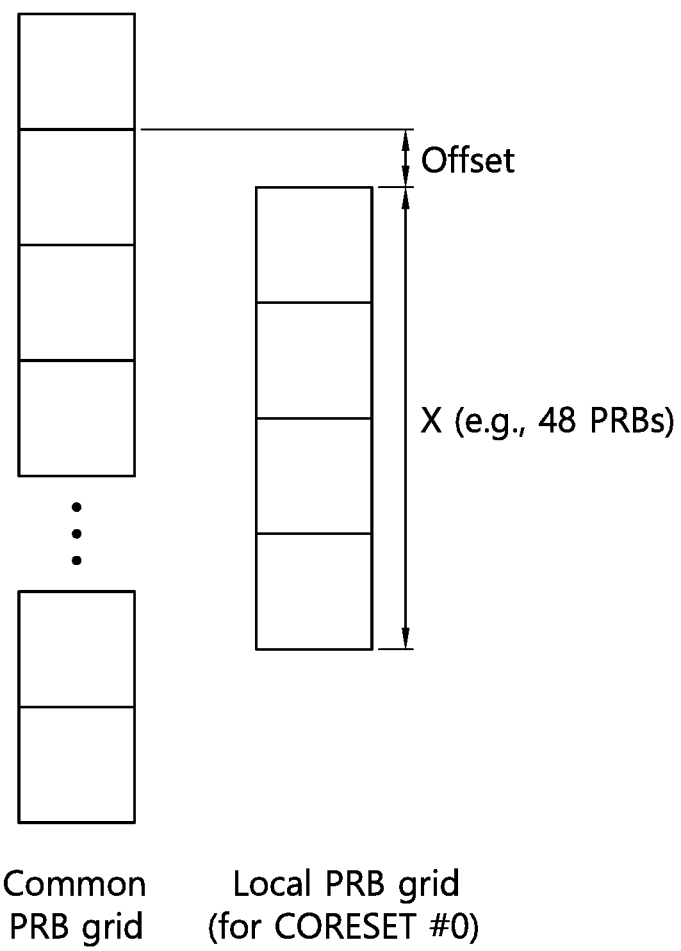
FIG. 11 shows an example of CORESET 0 configuration according to an embodiment of the present disclosure.

FIG. 11 shows an example of CORESET 0 configuration according to an embodiment of the present disclosure. Referring to FIG. 11, an additional offset which indicates an offset between local PRB indexing and common PRB indexing is configured, and CORESET 0 may be configured based on local PRB indexing according to the offset.

In case a search space configuration is not changed or a general search space configuration is used, various options may be considered to represent a beam sweeping search space.

First, the period may be explicitly or implicitly configured (in other words, periodicoffset configuration may be ignored for this case). To ignore this value, a special flag, "beam sweeping search space" may be added and indicated. Or, a specific value of periodoffset may be reserved to indicate the beam sweeping search space. If a beam sweeping search space is indicated, only the period may be obtained from other configuration or search space configuration.

Or, if a beam sweeping search space (or at least search space #0 and #1 for paging without a beam sweeping indication) is configured, a monitoring occasion within the period may be determined based on the physical layer procedure. Since the monitoring occasion is determined differently according to a CORESET configuration (relationship between CORESET and SS/PBCH block), a monitoring occasion needs to be indicated within the slot.

Therefore, a simple mechanism for monitoring is to configure the period with one or two or K slots (offset 0), and to configure a search space within the slot. Alternatively, the configuration of search space #0 may be used for each multiplexing type.

Alternatively, the PBCH configuration may be reused for search space #0 without involving BWP switching, handover, or PCell. A beam sweeping pattern due to multiplexing type 1 or multiplexing type 2 or multiplexing type 3 may be used for other search space. The starting slot for each paging occasion (PO) may be determined as the first System Frame Number (SFN) of a radio frame or slot 0 as determined in the CSS #0. In other words, beam sweeping may occur at every paging occasion. Or the same multiplexing/search space configuration may be used between CSS #0 and paging CSS, and the search space may be valid only from the starting PO. In other words, as described above, to determine the search space monitoring occasion, the starting slot of PO may be assumed to be SFN 0 within a radio frame or slot 0. Meanwhile, there may be a group PO for a set of UEs, or there may be a cell-specific PO shared among UEs camped on the same cell.

9. TCI State/QCL Information Assumption on Each Search Space

In the case of CORESET 0 or CORESET X, multiple search spaces may be configured. The TCI state/QCL assumption for each search space needs to be determined clearly as follows.

(1) The TCI state of search space #0 may be determined based on the configuration of search space #0 by the PBCH indication based on a detected SS/PBCH block or the best SS/PBCH block.

(2) The TCI state of search space #1 may be determined based on the RACH procedure.

(3) The TCI state of search space # X (for MSG4 or C-RNTI, which may be the same as search space #1) may be determined implicitly based on the RACH procedure, or explicitly based on RRC signaling and/or MAC CE, or based on the most recent operation among various options.

If different search spaces collide with each other in a given slot, and two search spaces may require different TCI states/QCL assumptions, priority may be determined as follows.

The priority may be determined according to the index of a search space. In other words, search space #0 may have higher priority than search space #1 (or other search space). Therefore, the UE may skip monitoring of other search spaces.

The priority may be determined according to the UE operation. For example, the priority may be determined in the order of paging, SI update, and C-RNTI (or other RNTI).

For search space #0 with respect to all of SS/PBCH blocks, the UE may monitor C-RNTI or other RNTI based the associated SS/PBCH block instead of other SS/PBCH block indexes. In all of monitoring occasions of search space #0 for the SS/PBCH block indicated as having been transmitted by RMSI and/or UE-specific RRC signaling, the UE may monitor the search space #0 regardless of whether the UE actually performs monitoring.

10. Beam Recovery CORESET Search Space Configuration

A beam recovery CORESET is configured and used when the beam recovery procedure is performed through the RACH procedure. The beam recovery CORESET may be regarded as a special CORESET used for the beam recovery procedure, and the currently indicated TCI state may not be aligned with the PRACH. The TCI state of the beam recovery CORESET may be determined based on the selected RACH preamble.

The search space of the beam recovery CORESET needs to include at least RA-RNTI and C-RNTI. A separate search space set or existing search space set may be associated with the beam recovery CORESET. While monitoring the beam recovery CORESET, monitoring of search spaces related to other CORESETs may use the following options.

(1) CORESET 0: The TCI state of CORESET 0 may be the same as the beam recovery CORESET. The TCI state of CORESET 0 may be determined in the same way as the beam recovery CORESET according to an explicit network configuration. If the TCI state of the beam recovery CORESET is determined based on a recent RACH procedure, the TCI state of the CORESET 0 may also be updated automatically, and monitoring of the CORESET 0 may be based on the new TCI state (namely, new SS/PBCH block index). In view of a search space set monitored in the CORESET 0, the following options may be considered.

The same search space set configured by PBCH or UE-common RRC signaling may be monitored. Therefore, the same monitoring occasion may be determined based on the SS/PBCH block index, RACH resource, and so on. In other words, a search space may be determined according to the RACH procedure and SS/PBCH block index.

An explicit search space may be configured. If CORESET 0 is not associated with the initial DL BWP, an explicit search space set may be configured for the CORESET 0. The UE may monitor only the configured search space until it is reconfigured. This option assumes that the TCI state of CORESET 0 of the non-initial DL BWP is explicitly configured.

If the UE detects a beam failure before a beam recovery message is transmitted to the UE through the beam recovery CORESET, the CORESET 0 may not be monitored.

(2) CORESET 0: Or, the CORESET 0 may not be monitored during the beam recovery procedure or after beam recovery. If the network updates the TCI state of the CORESET 0 explicitly, the CORESET 0 may be monitored again.

(3) Other CORESET: At least in the case of a CORESET associated with the TCI state, the CORESET may not be monitored until the beam recovery procedure is completed and/or an explicit update of the TCI state again makes the TCI state valid.

(4) Each time a beam recovery CORESET/search space set is monitored together, the beam recovery CORESET/search space set may have higher priority than CSS/USS of other CORESET from the viewpoint of blind decoding/channel estimation.

(5) If a previously associated SS/PBCH block and/or CSI-RS is no longer valid, the UE may not monitor the CORESET 0 (or CORESET not associated with other TCI). For example, the CORESET 0 may not be monitored during beam recovery. Also, the CORESET 0 may not be monitored if the best SS/PBCH block associated with a recent RACH procedure is not valid (namely if quality is low).

(6) If the network detects through beam management that the index of the best SS/PBCH block of the UE has been changed, the following options may be considered for monitoring of the CORESET 0.

The UE may abandon monitoring of the CORESET 0 until it returns to the initial DL BWP or reconfigured by the RACH procedure.

The UE may monitor the CSS based on the current best beam and may skip monitoring of C-RANTI (when the search space is different between at least C-RNTI and other RNTI is different).

The UE may monitor only specific RNTI (for example, SI-RNTI or P-RNTI) from the best beam but may skip monitoring for other RNTI. According to a search space configuration, the UE may skip monitoring of a specific search space set.

Figure 12:
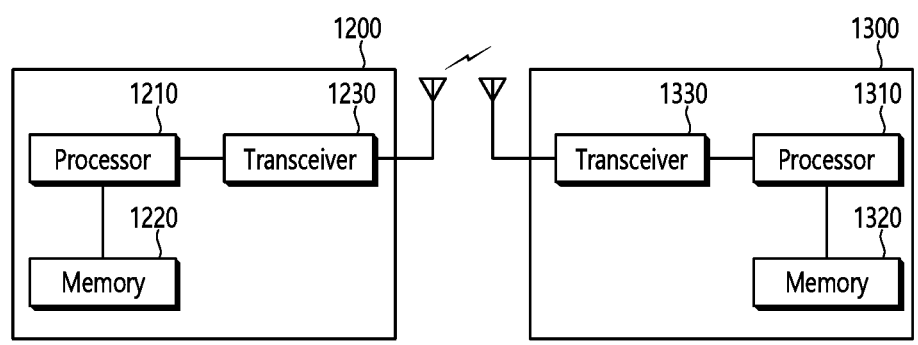
FIG. 12 shows a wireless communication system in which the embodiment of the present disclosure is implemented.

FIG. 12 shows a wireless communication system in which the embodiment of the present disclosure is implemented.

The UE 1200 includes a processor 1210, memory 1220, and transceiver 1230. The processor 1210 may be configured to implement functions, processes and/or methods described in the present specification. More specifically, the processor 1210 may be configured to control the transceiver 1230 to receive a MAC CE indication. The processor 1210 may be configured to perform a RACH procedure. The processor 1210 may be configured to determine the TCI state of CORESET 0 based on the most recent of the MAC CE indication or the RACH procedure. The processor 1210 may be configured to control the transceiver 1230 to monitor the CORESET 0 based on the determined TCI state.

The CORESET 0 may be a control region monitored to read RMSI. The TCI state may be associated with a beam and/or SS/PBCH block. The MAC CE may indicate a specific SS/PBCH block. The RACH procedure may be a contention-based RACH procedure. The contention-based RACH procedure may change the associated SS/PBCH block. The monitoring occasion of the search space #0 within the CORESET 0 may be based on the index of the SS/PBCH block corresponding to the determined TCI state.

The specific operation of the UE according to the embodiment above is as follows. If a value of 0 is provided (namely search space #0) for searchSpaceID in the PDCCH-Config-Common with respect to type0/0A/2-PDCCH CSS set, the UE determines a monitoring occasion for a PDCCH candidate of the type 0/0A/2-PDCCH CSS set. For the DCI format CRC-scrambled by C-RNTI, the UE monitors the corresponding PDCCH candidate only at the monitoring occasion associated with the SS/PBCH block QCLed with a CSI-RS in the TCI state of an active BWP including the CORESET of index 0 (namely CORESET 0). At this time, the TCI state is determined by the most recent of the indication by a MAC CE activation command or a random access procedure not initiated by the PDCCH command that triggers a contention-free random access procedure (namely contention-based random access procedure).

The memory 1220, being connected to the processor 1210, stores various pieces of information for operating the processor 1210. The transceiver 1230, being connected to the processor 1210, transmits a radio signal to the network node 1300 or receives a radio signal from the network node 1300.

The network node 1300 includes a processor 1310, memory 1320, and transceiver 1330. The processor 1310 may be configured to implement functions, processes and/or methods described in the present specification. More specifically, the processor 1210 may be configured to control the transceiver 1330 to transmit a MAC CE indication. The processor 1310 may be configured to perform a RACH procedure. The processor 1310 may be configured to control the transceiver 1310 to transmit a control signal through the CORESET 0.

The memory 1320, being connected to the processor 1310, stores various pieces of information for operating the processor 1310. The transceiver 1330, being connected to the processor 1310, transmits a radio signal to the UE 1200 or receives a radio signal from the UE 1200.

The processor 1210, 1310 may include Application-Specific Integrated Circuit (ASIC), other chipset, logical circuit and/or data processing device. The memory 1220, 1320 may include Read-Only Memory (ROM), Random Access Memory (RAM), flash memory, memory card, storage medium and/or other storage device. The transceiver 1230, 1330 may include a baseband circuit for processing a radio frequency signal. When an embodiment is implemented by software, the aforementioned method may be implemented by a module (process or function) which performs the aforementioned function. The module may be stored in the memory 1220, 1320 and executed by the processor 1210, 1310. The memory 1220, 1320 may be installed inside or outside the processor 1210, 1310 and may be connected to the processor 1210, 1310 via various well-known means.

According to one embodiment of the present disclosure described with reference to FIG. 12, the TCI state of CORESET 0 may be updated explicitly by the MAC CE or implicitly by the RACH procedure. More specifically, since CORESET 0 has to be readable by all of UEs, the TCI state may not be explicitly indicated by RRC signaling, and not only broadcast data but also unicast data such as MSG4 may also be scheduled through the CORESET 0. Therefore, as the most effective method for updating the TCI state of the CORESET 0, the most recent of the MAC CE or RACH procedure may be used.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a wireless device in a wireless communication system, the method comprising:
   receiving a Media Access Control (MAC) Control Element (CE) indication;
   performing a Random Access Channel (RACH) procedure;
   determining a Transmission Configuration Indicator (TCI) state of Control Resource Set (CORESET) 0based on most recent of the MAC CE indication or the RACH procedure; and
   monitoring the CORESET 0based on the determined TCI state,
   wherein a monitoring occasion of search space #0 within the CORESET 0is based on an index of a synchronization signal (SS)/physical broadcast channel (PBCH) block corresponding to the determined TCI state.

2. The method of claim 1, wherein the CORESET 0is a control region monitored to read Remaining Minimum System Information (RMSI).

3. The method of claim 1, wherein the TCI state is associated with a beam and/or SS/PBCH block.

4. The method of claim 1, wherein the MAC CE indicates a specific SS/PBCH block.

5. The method of claim 1, wherein the RACH procedure is a contention-based RACH procedure.

6. The method of claim 5, wherein the contention-based RACH procedure changes an associated SS/PBCH block.

7. A wireless device in a wireless communication system, comprising:
   a memory;
   a transceiver; and
   a processor connected to the memory and the transceiver, wherein the wireless device is configured to:
   receive a Media Access Control (MAC) Control Element (CE) indication;
   perform a Random Access Channel (RACH) procedure;
   determine a Transmission Configuration Indicator (TCI) state of Control Resource Set (CORESET) 0based on most recent of the MAC CE indication or the RACH procedure; and
   monitor the CORESET 0based on the determined TCI state,
   wherein a monitoring occasion of search space #0 within the CORESET 0is based on an index of a synchronization signal (SS)/physical broadcast channel (PBCH) block corresponding to the determined TCI state.

8. The wireless device of claim 7, wherein the CORESET 0is a control region monitored to read Remaining Minimum System Information (RMSI).

9. The wireless device of claim 7, wherein the TCI state is associated with a beam and/or SS/PBCH block.

10. The wireless device of claim 7, wherein the MAC CE indicates a specific SS/PBCH block.

11. The wireless device of claim 7, wherein the RACH procedure is a contention-based RACH procedure.

12. The wireless device of claim 11, wherein the contention-based RACH procedure changes an associated SS/PBCH block.

* * * * *